(12) United States Patent
Hsu et al.

(10) Patent No.: US 9,445,417 B2
(45) Date of Patent: Sep. 13, 2016

(54) APPARATUS AND METHOD OF SHARING A TRANSMIT CHAIN IN WIRELESS COMMUNICATIONS

(71) Applicant: QUALCOMM Incorporated, San Diego, CA (US)

(72) Inventors: Liangchi Hsu, San Diego, CA (US); Sitaramanjaneyulu Kanamarlapudi, San Diego, CA (US); Valibabu Saladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 14/470,872

(22) Filed: Aug. 27, 2014

(65) Prior Publication Data

US 2015/0289266 A1  Oct. 8, 2015

Related U.S. Application Data

(60) Provisional application No. 61/976,778, filed on Apr. 8, 2014.

(51) Int. Cl.
*H04W 72/10* (2009.01)
*H04W 36/36* (2009.01)
*H04W 76/04* (2009.01)
*H04W 88/06* (2009.01)
*H04W 72/04* (2009.01)
*H04W 72/12* (2009.01)

(52) U.S. Cl.
CPC ......... *H04W 72/0446* (2013.01); *H04W 36/36* (2013.01); *H04W 72/1215* (2013.01); *H04W 76/048* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,967,963 B1* | 11/2005 | Houh | H04L 12/5693 370/428 |
| 2008/0045262 A1* | 2/2008 | Phan | H04W 36/0083 455/525 |
| 2012/0044880 A1* | 2/2012 | Sun | H04W 72/1242 370/329 |
| 2013/0137469 A1 | 5/2013 | Schmidt et al. | |
| 2013/0259016 A1* | 10/2013 | Xhafa | H04W 84/18 370/338 |
| 2013/0324113 A1 | 12/2013 | Jechoux et al. | |
| 2013/0331137 A1* | 12/2013 | Burchill | H04W 52/243 455/501 |
| 2014/0003244 A1 | 1/2014 | Zisimopoulos et al. | |
| 2014/0022904 A1 | 1/2014 | Ahmad et al. | |

(Continued)

OTHER PUBLICATIONS

3rd Generation Partnership Project, Technical Specification Group Radio Access Network, Evolved Universal Terrestrial Radio Access (E-UTRA), Study on signalling and procedure for interference avoidance for in-device coexistence (Release 11), 3GPP Standard, 3GPP TR 36.816, Mobile Competence Centre, 650, Route Des Lucioles, F-06921 Sophia-Antipolis Cedex, vol. RAN WG2, No. V11.2.0, Dec. 22, 2011, pp. 1-44, XP050555147.

(Continued)

*Primary Examiner* — Ayaz Sheikh
*Assistant Examiner* — Tarell Hampton
(74) *Attorney, Agent, or Firm* — Loza & Loza LLP

(57) ABSTRACT

Aspects of the present disclosure relate to a user equipment (UE) that can maintain active connections on multiple wireless communication networks. The UE shares a transmission resource when transmitting (TX) on a first radio access technology (RAT) and a second RAT in a time-division manual. During TX sharing, the UE provide uplink recovery and protection to one of the RATs.

24 Claims, 15 Drawing Sheets

(56) References Cited

U.S. PATENT DOCUMENTS

2014/0112127 A1   4/2014   Jayaram et al.
2014/0126399 A1   5/2014   Damnjanovic et al.
2015/0023258 A1*   1/2015   Hu .................... H04W 76/026
                                                                     370/329
2015/0050952 A1*   2/2015   Ponukumati .......... H04W 68/02
                                                                     455/458

OTHER PUBLICATIONS

International Search Report and Written Opinion—PCT/US2015/021724—ISA/EPO—Jul. 15, 2015.

* cited by examiner

Access Network

Protocol Stack

APPARATUS AND METHOD OF SHARING A TRANSMIT CHAIN IN WIRELESS COMMUNICATIONS

CROSS-REFERENCE TO RELATED APPLICATIONS

This application claims priority to and the benefit of a provisional patent application Ser. No. 61/976,778 filed in the United States Patent Office on Apr. 8, 2014, the entire content of which is incorporated herein by reference.

TECHNICAL FIELD

Aspects of the present disclosure relate generally to wireless communication systems, and more particularly, to a user equipment equipped to support multiple radio access technologies with a shared radio frequency resource and methods of operating the same.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of a radio access technology (RAT) is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UTRAN utilizes a Wideband Code Division Multiple Access (W-CDMA) air interface. Another 3GPP standard is Global System for Mobile Communications (GSM) that supports a GSM EDGE Radio Access Network (GERAN). Other examples of RAT or standards include High Speed Packet Access (HSPA), CDMA2000, Wireless LAN (WLAN), Long Term Evolution (LTE), Worldwide Interoperability for Microwave Access (WiMAX), etc.

Some wireless user equipment (UE) can support two or more RATs. For example, a UE may be equipped with multiple SIM cards to access multiple networks associated with different subscriptions. Some such devices can share transmission resources (e.g., modem, transceiver, RF front end, low noise amplifier, etc.) for accessing multiple networks simultaneously. One example of such UE is a dual-SIM dual active (DSDA) UE, which can be simultaneously active on two networks using the same or different RATs. Some DSDA devices have a single transmission (TX) chain, which is shared for accessing both networks simultaneously.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to a user equipment (UE) that can maintain active connections on multiple wireless communication networks. In some aspects of the disclosure, the UE shares a transmission resource when transmitting (TX) on a first radio access technology (RAT) and a second RAT (i.e., TX sharing) in a time-division manual. In some aspects of the disclosure, during TX sharing, the UE can provide certain uplink recovery and protection to one of the RATs.

In one aspect, the disclosure provides a method of wireless communication operable at a user equipment (UE). The UE transmits a first uplink transmission for a first radio access technology (RAT) utilizing a shared transmission resource. The UE further transmits a second uplink transmission for a second RAT utilizing the shared transmission resource. If the first uplink transmission and the second uplink transmission at least partially overlap in time, the UE protects the first uplink transmission in accordance with one or more radio bearer protection rules. The first uplink transmission includes at least one of a signaling radio bearer (SRB) or a data radio bearer (DRB).

Another aspect of the disclosure provides a user equipment (UE) for wireless communications. The UE includes a first radio access technology block, a second radio access technology block, and a TX sharing manager. The first radio access technology block is configured to transmit a first uplink transmission for a first radio access technology (RAT) utilizing a shared transmission resource. The second radio access technology block is configured to transmit a second uplink transmission for a second RAT utilizing the shared transmission resource. The TX sharing manager is configured to if the first uplink transmission and the second uplink transmission at least partially overlap in time, protect the first uplink transmission in accordance with one or more radio bearer protection rules. The first uplink transmission includes at least one of a signaling radio bearer (SRB) or a data radio bearer (DRB).

Another aspect of the disclosure provides a computer readable medium including code for causing a user equipment (UE) to perform communication related operations. The code causes the UE to transmit a first uplink transmission for a first radio access technology (RAT) utilizing a shared transmission resource. The code further causes the UE to transmit a second uplink transmission for a second RAT utilizing the shared transmission resource. The code further causes the UE to if the first uplink transmission and the second uplink transmission at least partially overlap in time, protect the first uplink transmission in accordance with one or more radio bearer protection rules. The first uplink transmission includes at least one of a signaling radio bearer (SRB) or a data radio bearer (DRB).

Another aspect of the disclosure provides a user equipment (UE) for wireless communications. The UE includes means for transmitting a first uplink transmission for a first radio access technology (RAT) utilizing a shared transmission resource. The UE further includes means for transmitting a second uplink transmission for a second RAT utilizing the shared transmission resource. The UE further includes means for if the first uplink transmission and the second uplink transmission at least partially overlap in time, protecting the first uplink transmission in accordance with one or more radio bearer protection rules. The first uplink transmission includes at least one of a signaling radio bearer (SRB) or a data radio bearer (DRB).

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure relate to a user equipment (UE) that can maintain active connections on multiple wireless communication networks. In some aspects of the disclosure, the UE shares a transmission resource when transmitting (TX) on a first radio access technology (RAT) and a second radio access technology (i.e., TX sharing) in a time-division manual. The shared transmission resource may include an RF resource. In one example, the first RAT may be W-CDMA, and the second RAT may be GSM. In some aspects of the disclosure, during TX sharing, the UE can provide additional uplink recovery and protection to the W-CDMA TX. However, the present disclosure is not limited to W-CDMA and GSM TX sharing, and may be applied with other RATs.

Figure 1:
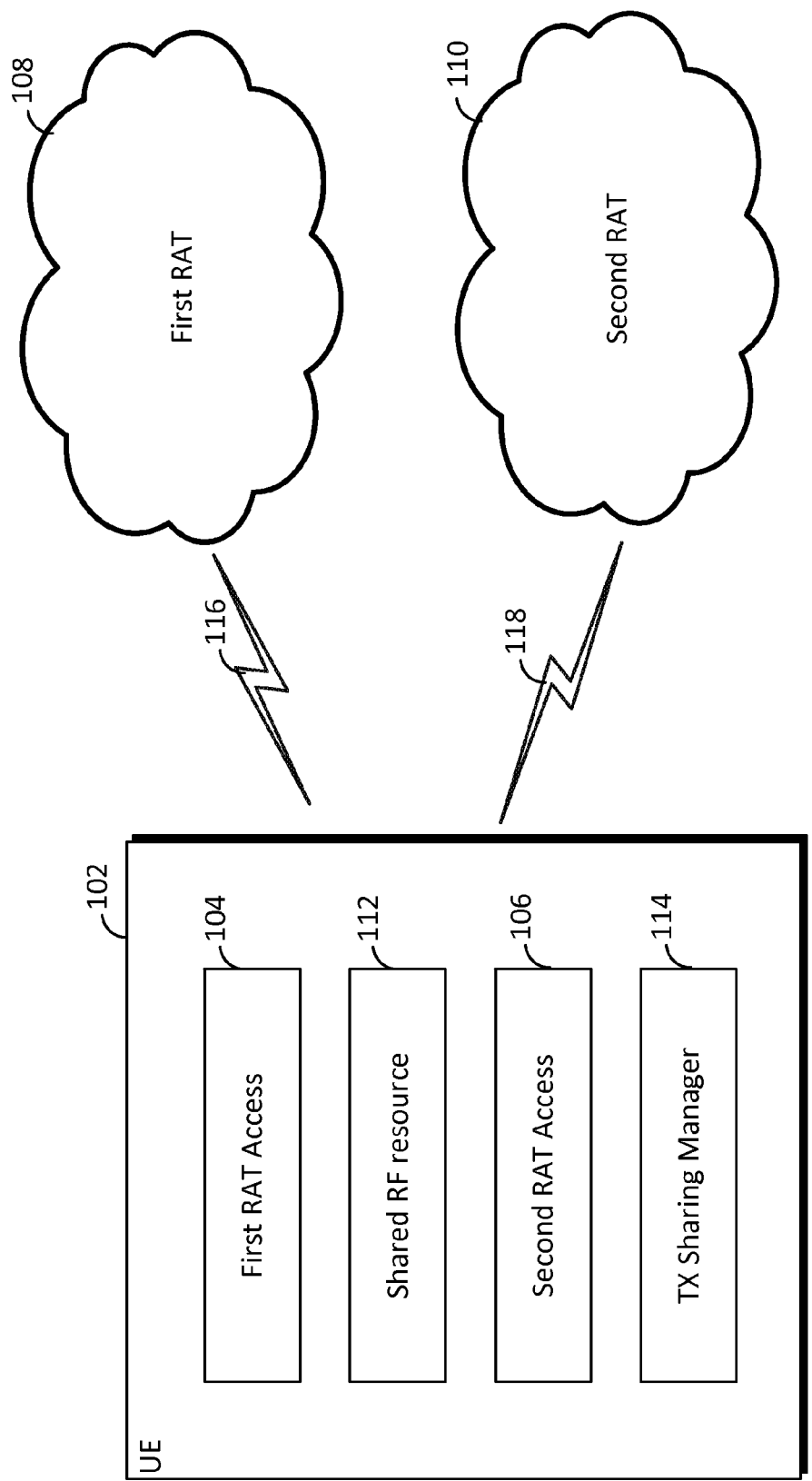
FIG. 1 is a diagram illustrating a user equipment (UE) that can simultaneously maintain active communication or traffic on two or more wireless networks when sharing a common radio frequency (RF) resource in accordance with aspects of the disclosure.

FIG. 1 is a diagram illustrating a UE 102 that can simultaneously (or concurrently) maintain active communication or traffic on two or more wireless networks when sharing a common RF resource (a transmission resource) in accordance with aspects of the disclosure. The UE 102 has a first radio access technology (RAT) block 104 and a second RAT access block 106. By way of example and not limitation, the first RAT access block 104 is configured to communicate with a network utilizing a first RAT 108, and the second RAT access block 106 is configured to communicate with a network utilizing a second RAT 110. In one example, the first RAT 108 may be W-CDMA, and the second RAT 110 may be GSM. In some examples, the UE 102 may support other RATs. In one aspect of the disclosure, the UE 102 may be a DSDA UE.

In one aspect of the disclosure, each of the first and second RAT access blocks 104 and 106 may include separate receive (RX) chains for receiving signals from the first RAT 108 and second RAT 110, respectively. The first RAT access block 104 and second RAT access block 106 may share an RF resource 112 (communication resource) for wireless communication utilizing the first RAT 108 and second RAT 110, respectively. For example, the shared RF resource 112 may include a TX chain. In some examples, the TX chain may include various filters, amplifiers, mixers, converters, and other generally known components of a TX chain. The UE 102 also includes a TX sharing manager block 114, which is configured to manage and protect certain TX data of the first RAT 108 and/or second RAT 110 during TX sharing. For example, the TX sharing manager block 114 may facilitate or control which of the first RAT access block 104 and second RAT access block 106 will have priority using the shared RF resource 112 in different TX sharing situations. In some aspects of the disclosure, the TX sharing manager block 114 can provide uplink recovery and protection to W-CDMA uplink transmissions. The TX sharing manager block 114 will be described in more detail below in FIGS. 3 and 8-15. The various components, elements, and blocks of the UE 102 may be implemented in software, firmware, hardware, or a combination thereof, which will be described in more detail below.

Figure 2:
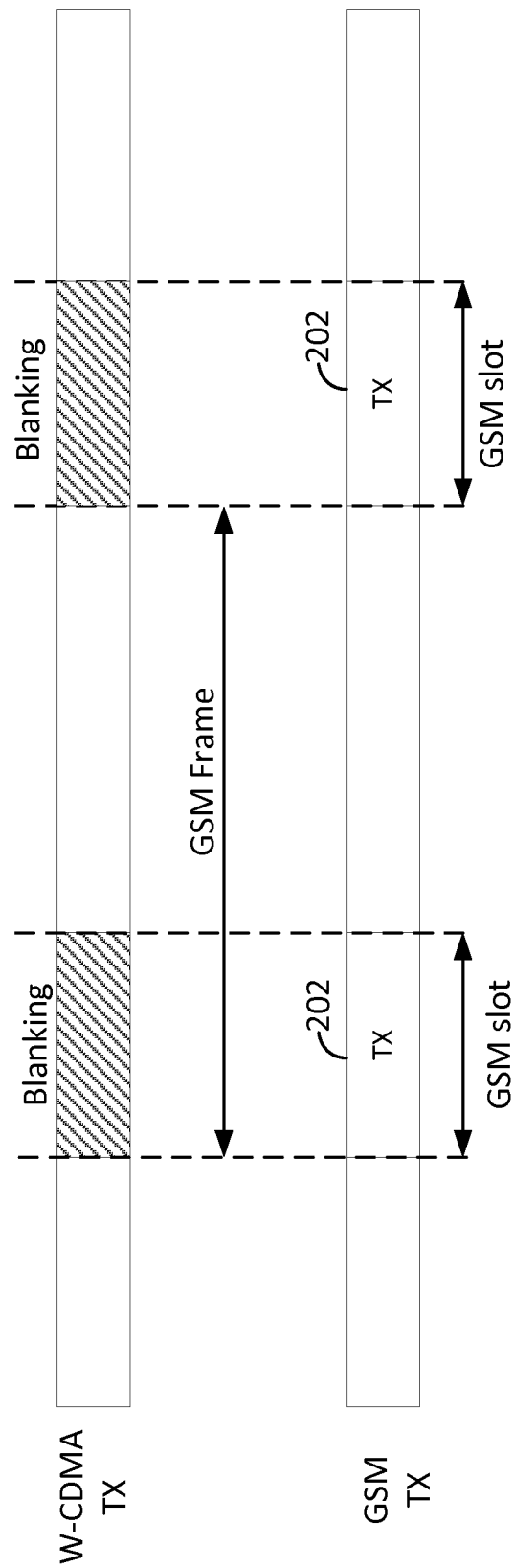
FIG. 2 is a diagram illustrating an example of W-CDMA and GSM contention when a UE shares an RF resource.

FIG. 2 is a diagram illustrating an example of W-CDMA and GSM TX contention when a UE 102 shares the RF resource 112 for simultaneous W-CDMA and GSM uplink transmissions. Here, the W-CDMA and GSM uplink transmissions at least partially overlap in time (i.e., TX contention). When the UE 102 is active and transmitting on a GSM uplink, one GSM slot 202 out of one GSM frame is dedicated to that UE 102. A W-CDMA/GSM contention occurs, due to TX sharing, when the GSM transmission in each GSM frame causes blanking in the W-CDMA uplink transmission, for example, in each 10 ms (millisecond) transmission time interval (TTI) or radio frame. Similarly, W-CDMA side blanking due to GSM TX may undesirably impact 20 ms TTI and 40 ms TTI W-CDMA frames (not shown in FIG. 2). In addition, this blanking may affect W-CDMA Release 99 (Rel-99) signaling, voice, Enhanced Uplink (EUL, also known as High-Speed Uplink Packet Access (HSUPA) 10 ms TTI and 2 ms TTI, etc. Therefore, suitable W-CDMA protection mechanisms are needed to mitigate the contention problems between W-CDMA and GSM while sharing a TX chain.

Figure 3:
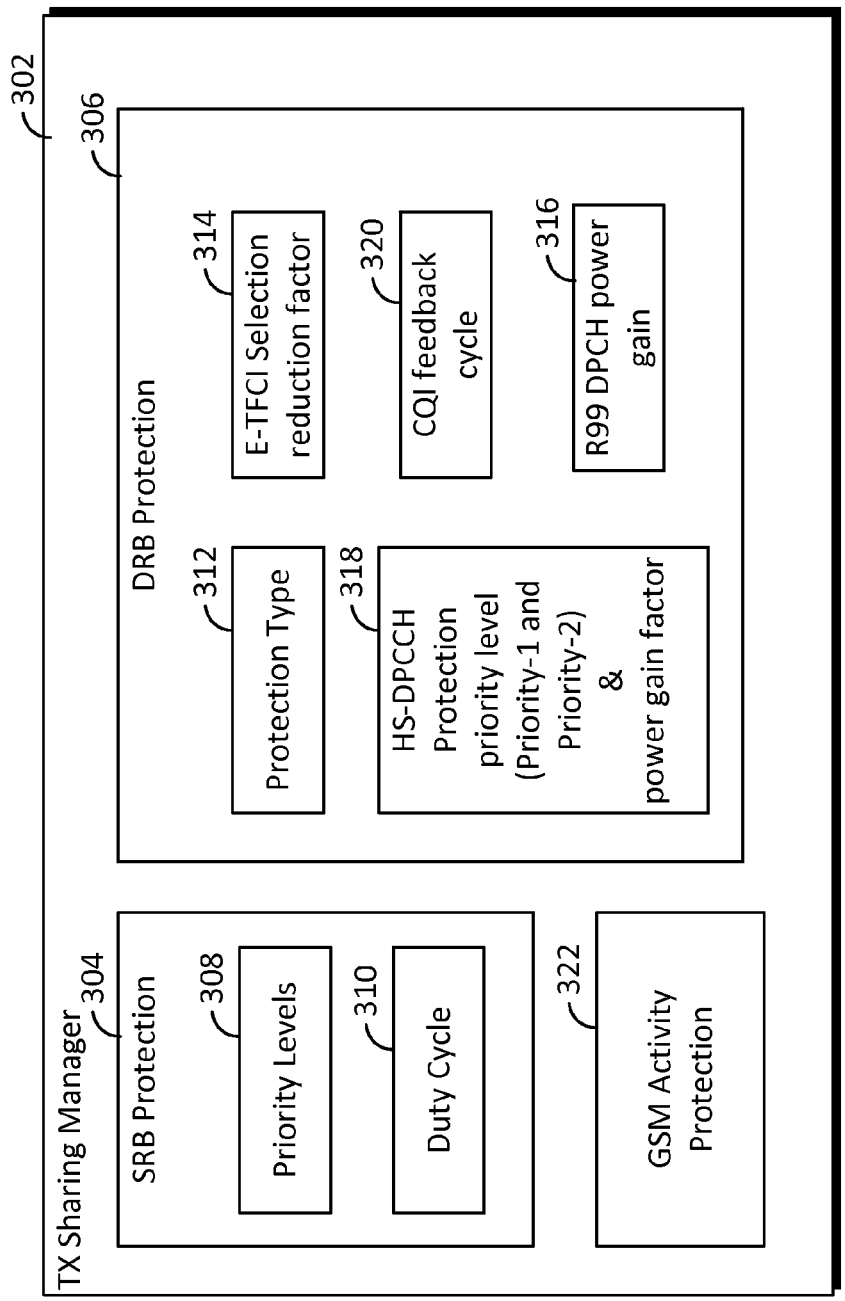
FIG. 3 is a block diagram illustrating a TX sharing manager configured to provide signaling radio bearer (SRB) and data radio bearer (DRB) protection to W-CDMA uplink transmission and GSM voice transmission protection during TX sharing in accordance with aspects of the disclosure.

FIG. 3 is a block diagram illustrating a TX sharing manager 302 configured to provide signaling radio bearer (SRB) and data radio bearer (DRB) protection to W-CDMA uplink transmission and GSM voice transmission protection during TX sharing in accordance with aspects of the disclosure. The TX sharing manager 302 may be included in any of the UEs illustrated in FIGS. 1, 4, 5, and/or 6. In one example, the TX sharing manager 302 may be the same as the TX sharing manager block 114 of FIG. 1. In some aspects of the disclosure, the TX sharing manager 302 may be configured to handle other RATs. In some aspects of the disclosure, the TX sharing manager 302 provides W-CDMA specific enhancements for TX sharing between W-CDMA and GSM transmissions. The TX sharing manager 302 includes an SRB protection block 304, a DRB protection block 306, and a GSM activity protection block 322. The various components of the TX sharing manager 302 will be described below in relation to FIGS. 8-15.

Figure 4:
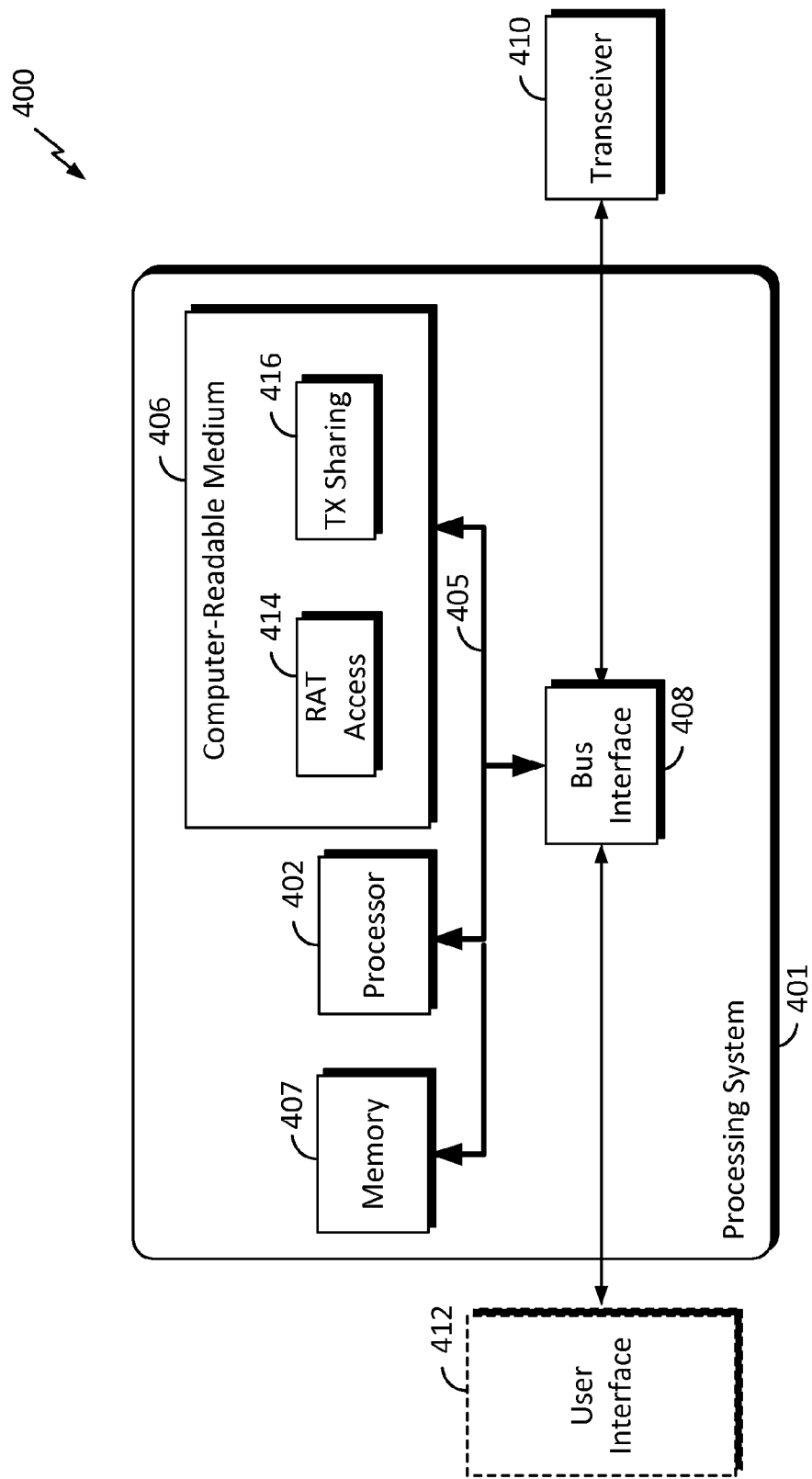
FIG. 4 is a block diagram illustrating an example of a hardware implementation for an apparatus employing a processing system in accordance with an aspect of the disclosure.

FIG. 4 is a diagram illustrating an example of a hardware implementation for an apparatus 400 employing a processing system 401. In accordance with various aspects of the disclosure, an element, or any portion of an element, or any combination of elements may be implemented with a processing system 401 that includes one or more processors 402. For example, the apparatus 400 may be any of the UEs illustrated in FIGS. 1, 4, 5, and/or 6. Examples of processors 402 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 402, as utilized in an apparatus 400, may be used to implement any one or more of the methods, steps and processes described in this specification and illustrated in FIGS. 8-15.

In this example, the processing system 401 may be implemented with a bus architecture, represented generally by the bus 405. The bus 405 may include any number of interconnecting buses and bridges depending on the specific application of the processing system 401 and the overall design constraints. The bus 405 links together various circuits including one or more processors (represented generally by the processor 402), a memory 403, and computer-readable media (represented generally by the computer-readable medium 406). The bus 405 may also link various other circuits such as timing sources, peripherals, voltage regulators, and power management circuits, which are well known in the art, and therefore, will not be described any further. A bus interface 408 provides an interface between the bus 405 and a transceiver 410. The transceiver 410 provides a means for communicating with various other apparatus over a transmission medium. For example, the transceiver 410 may include one or more modems, RF circuitries, etc., for supporting connections with multiple subscriptions using the same or different RATs. Depending upon the nature of the apparatus, a user interface 412 (e.g., keypad, display, speaker, microphone, joystick, touchpad, or touchscreen) may also be provided.

The processor 402 is responsible for managing the bus 405 and general processing, including the execution of software stored on the computer-readable medium 406. For example, the software, when executed by the processor 402, causes the processing system 401 to perform the various functions described throughout this specification and illustrated in the drawings for any particular apparatus. For example, the software may include codes when executed by the processor 402 to perform the various functions, steps, and processes described in FIGS. 8-15. The computer-readable medium 406 may also be used for storing data that is manipulated by the processor 402 when executing software.

In various aspects of the disclosure, the software may include RAT access code 414, when executed by the processor 402 in conjunction with the memory 407, to implement the first RAT access block 104 and the second RAT access block 106. The software may also include TX sharing code 416, when executed by the processor 402 in conjunction with the memory 407, to implement the TX sharing manager block 114 of the UE 102. In one aspect of the disclosure, the transceiver 410 in conjunction with other components of the apparatus 400 may be used to implement the shared RF resource 112 of the UE 102. In some aspects of the disclosure, the TX sharing code 416, when executed by the processor 402 in conjunction with the memory 407, can implement the various blocks and components of the TX Sharing Manager 302 of FIG. 3. For example, the TX sharing code 416, when executed by the processor 402, may implement the functions performed by the SRB protection block 304, DRB protection block 306, and/or GSM activity protection block 322.

One or more processors 402 in the processing system may execute various software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 401, external to the processing system 401, or distributed across multiple entities including the processing system 401. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
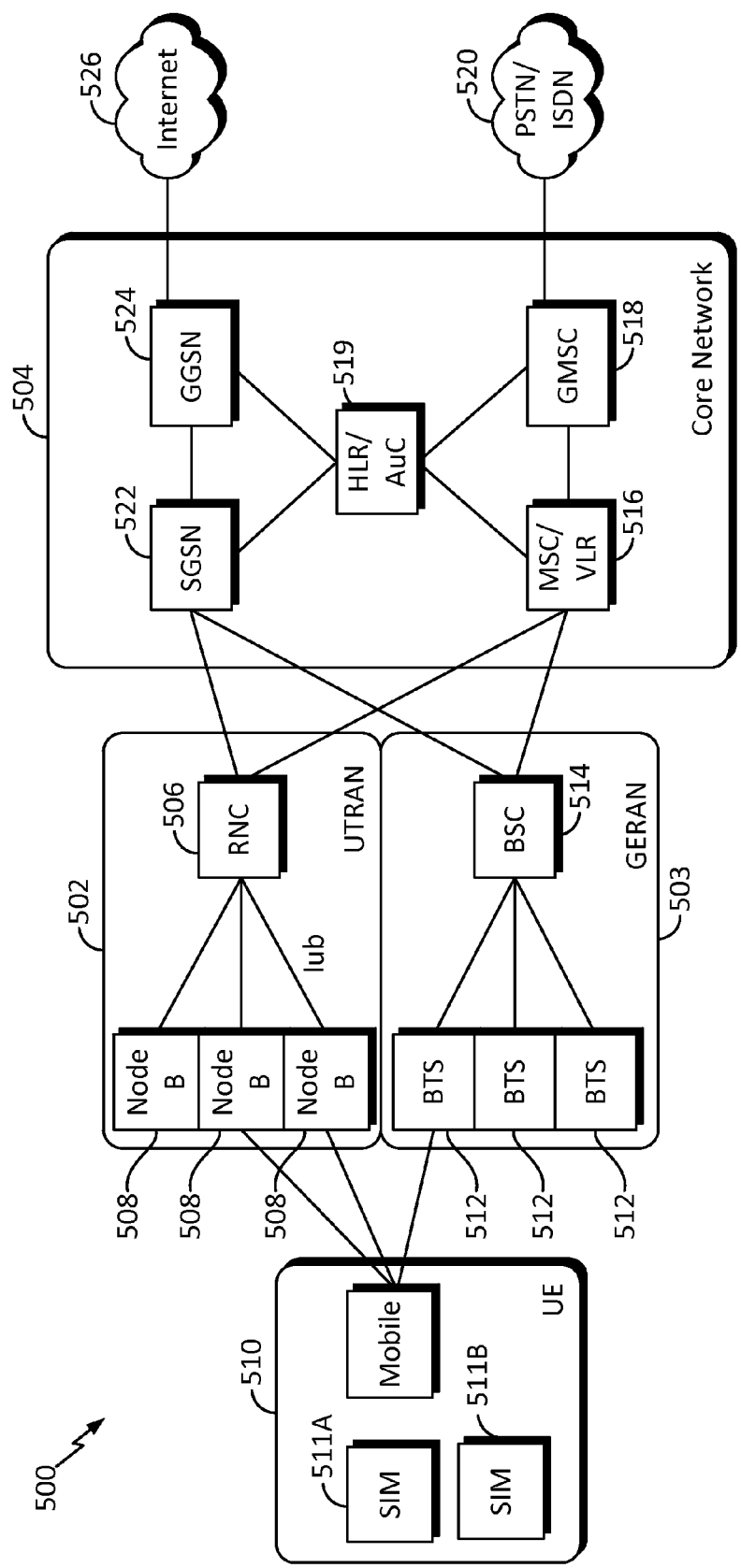
FIG. 5 is a block diagram illustrating an example of a telecommunications system.

The various concepts presented throughout this disclosure may be implemented across a broad variety of telecommunication systems, network architectures, and communication standards. Referring now to FIG. 5, as an illustrative example without limitation, various aspects of the present disclosure are illustrated with reference to a Universal Mobile Telecommunications System (UMTS) network 500. The UMTS network 500 includes three interacting domains: a core network 504, a radio access network (RAN) including a UTRAN 502 and a GERAN 503, and a UE 510. In one example, the UE 510 may be any of the UEs of FIGS. 1, 4, and/or 6. Among several options available for a UTRAN 502, in this example, the illustrated UTRAN 502 may employ a W-CDMA air interface for enabling various wireless services including telephony, video, data, messaging, broadcasts, and/or other services. The UTRAN 502 may include a plurality of Radio Network Subsystems (RNSs), each controlled by a respective Radio Network Controller (RNC) such as an RNC 506. Here, the UTRAN 502 may include any number of RNCs and RNSs. The RNC 506 is an apparatus responsible for, among other things, assigning, reconfiguring, and releasing radio resources within the RNS. The RNC 506 may be interconnected to other RNCs (not shown) in the UTRAN 502 through various types of interfaces such as a direct physical connection, a virtual network, or the like using any suitable transport network.

In some aspects of the disclosure, the UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 502 is based on such DS-CDMA technology and additionally calls for a frequency division duplexing (FDD). FDD uses a different carrier frequency for the uplink (UL) and downlink (DL) between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

The geographic region covered by an RNS may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in an RNS; however, the RNS may include any number of wireless Node Bs. The Node Bs 508 provide wireless access points to the core network 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a tablet, or any other similar functioning devices. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 510 may further include a universal subscriber identity module (USIM) or SIM, which stores the subscriber's identity and provides a user's subscription information to a network as well as performing other security and authentication roles. In one aspect of the disclosure, the UE 510 may have multiple USIMs including a first SIM 511A and a second SIM 511B, which are associated with different subscriptions or networks/RATs. For illustrative purposes, one UE 510 is shown in communication with a number of the Node Bs 508 utilizing the first SIM 511A. The downlink (DL), also called the forward link, refers to the communication link from a Node B 508 to a UE 510 and the uplink (UL), also called the reverse link, refers to the communication link from a UE 510 to a Node B 508.

The GERAN 503 provides for GSM access and includes a number of BTS's 512 and a BSC 514. However, the GERAN 503 may include any number of BTS's and BSCs. In some aspects of the disclosure, the GERAN 503 may utilize a time division multiple access (TDMA) air interface, such as one defined in the GSM standard. The UE 510 can be in communication with one or more of the BTS's 512 utilizing the second SIM 511B.

The core network 504 can interface with one or more access networks, such as the UTRAN 502 and GERAN 503. As shown, the core network 504 is a UMTS core network. However, as those skilled in the art will recognize, the various concepts presented throughout this disclosure may be implemented in other suitable access networks, to provide UEs with access to types of core networks other than UMTS networks such as cdma2000, Long Term Evolution (LTE) networks, etc.

The illustrated UMTS core network 504 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 504 supports circuit-switched services with an MSC 516 and a GMSC 518. In some applications, the GMSC 518 may be referred to as a media gateway (MGW). One or more RNCs, such as the RNC 506, may be connected to the MSC 516. The MSC 516 is an apparatus that controls call setup, call routing, and UE mobility functions. The MSC 516 also includes a visitor location register (VLR) that contains subscriber-related information for the duration that a UE is in the coverage area of the MSC 516. The GMSC 518 provides a gateway through the MSC 516 for the UE to access a circuit-switched network 520. The GMSC 518 includes a home location register (HLR) 519 containing subscriber data, such as the data reflecting the details of the services to which a particular user has subscribed. The HLR is also associated with an authentication center (AuC) that contains subscriber-specific authentication data. When a call is received for a particular UE, the GMSC 518 queries the HLR 519 to determine the UE's location and forwards the call to the particular MSC serving that location.

The illustrated core network 504 also supports packet-switched data services with a serving GPRS support node (SGSN) 522 and a gateway GPRS support node (GGSN) 524. General Packet Radio Service (GPRS) is designed to provide packet-data services at speeds higher than those available with standard circuit-switched data services. The GGSN 524 provides a connection for the UTRAN 502 and GERAN 503 to a packet-based network 526. The packet-based network 526 may be the Internet, a private data network, or some other suitable packet-based network. The primary function of the GGSN 524 is to provide the UEs 510 with packet-based network connectivity. Data packets may be transferred between the GGSN 524 and the UEs 510 through the SGSN 522, which performs primarily the same functions in the packet-based domain as the MSC 516 performs in the circuit-switched domain.

The illustrated UE 510 may be a DSDA UE including two SIMs 511A and 511B, but those of ordinary skill in the art will understand that this is illustrative in nature only, and a UE may include any suitable number of SIMs, virtual SIMs, or no SIM. User equipment such as the UE 510 having multiple SIMs are sometimes referred to as multi-SIM devices, with one particular example with two SIMs being called a DSDA device. A DSDA device is capable of maintaining active traffic on two networks (or subscriptions) simultaneously, where an RF resource (e.g., a shared TX chain) of the UE 510 is shared by both subscriptions on the respective networks. In this way, active data connections and/or calls may be maintained on both of the networks or subscriptions with a single device.

As described above, the illustrated UE 510 is capable of utilizing more than one RAT (e.g., W-CDMA and GSM), wherein the UE 510 can simultaneously maintain active traffic or connections for two or more subscriptions using two or more different RATs. For example, the UE 210 can support various RATs including W-CDMA, GSM, LTE, CDMA2000, Wi-MAX, Wi-Fi, or any other suitable RATs.

Figure 6:
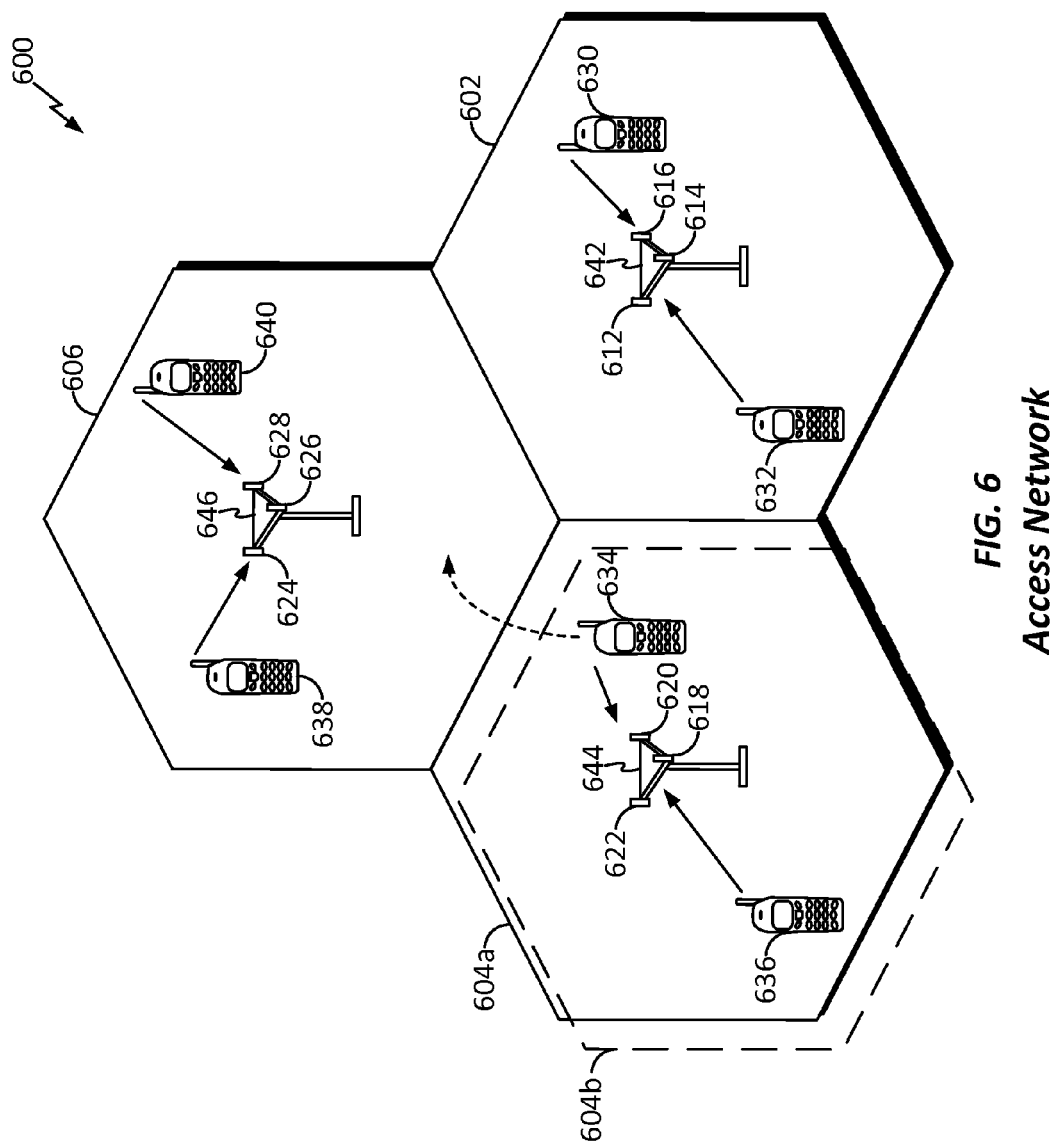
FIG. 6 is a diagram illustrating an example of an access network.

The UTRAN 502 is one example of a RAN that may be utilized in accordance with the present disclosure. Referring to FIG. 6, by way of example and without limitation, a simplified schematic illustration of a RAN 600 in a UTRAN architecture is illustrated. The system includes multiple cellular regions (cells), including cells 602, 604, and 606, each of which may include one or more sectors. Cells may be defined geographically (e.g., by coverage area) and/or may be defined in accordance with a frequency, scrambling code, etc. That is, the illustrated geographically-defined cells 602, 604, and 606 may each be further divided into a plurality of cells, e.g., by utilizing different scrambling codes. For example, a first cell may utilize a first scrambling code, and a second cell, while in the same geographic region and served by the same Node B 644, may be distinguished by utilizing a second scrambling code.

In a cell that is divided into sectors, the multiple sectors within a cell can be formed by groups of antennas with each antenna responsible for communication with UEs in a portion of the cell. For example, in cell 602, antenna groups, 614, and 616 may each correspond to a different sector. In cell 604, antenna groups 618, 620, and 622 may each correspond to a different sector. In cell 606, antenna groups 624, 626, and 628 may each correspond to a different sector.

The cells 602, 604, and 606 may include several UEs that may be in communication with one or more sectors of each cell 602, 604, or 606. For example, UEs 630 and 632 may be in communication with Node B 642, UEs 634 and 636 may be in communication with Node B 644, and UEs 638 and 640 may be in communication with Node B 646. Here, each Node B 642, 644, and 646 may be configured to provide an access point to one or more core network (e.g., core network 504 of FIG. 5) for all the UEs 630, 632, 634, 636, 638, and 640 in the respective cells 602, 604, and 606.

During a call with a source cell, or at any other time, the UE 636 may monitor various parameters of the source cell as well as various parameters of neighboring cells. Further, depending on the quality of these parameters, the UE 636 may maintain communication with one or more of the neighboring cells. During this time, the UE 636 may maintain an Active Set, that is, a list of cells to which the UE 636 is simultaneously connected (i.e., the UTRAN cells that are currently assigning a downlink dedicated physical channel (DPCH) or fractional downlink dedicated physical channel (F-DPCH) to the UE 636 may constitute the Active Set). In some aspects of the disclosure, any of the UEs of FIG. 6 may be a DSDA device capable of simultaneously active for multiple subscriptions each associated with a corresponding network/RAT such as W-CDMA and GSM.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 510 and the core network 504 (referring to FIG. 5), and may include circuit switched and packet switched protocols. The AS provides the lower layers, for signaling between the UTRAN 502/GERAN 503 and the UE 510, and may include a user plane and a control plane. Here, the user plane or data plane carries user traffic, while the control plane carries control information (i.e., signaling).

Figure 7:
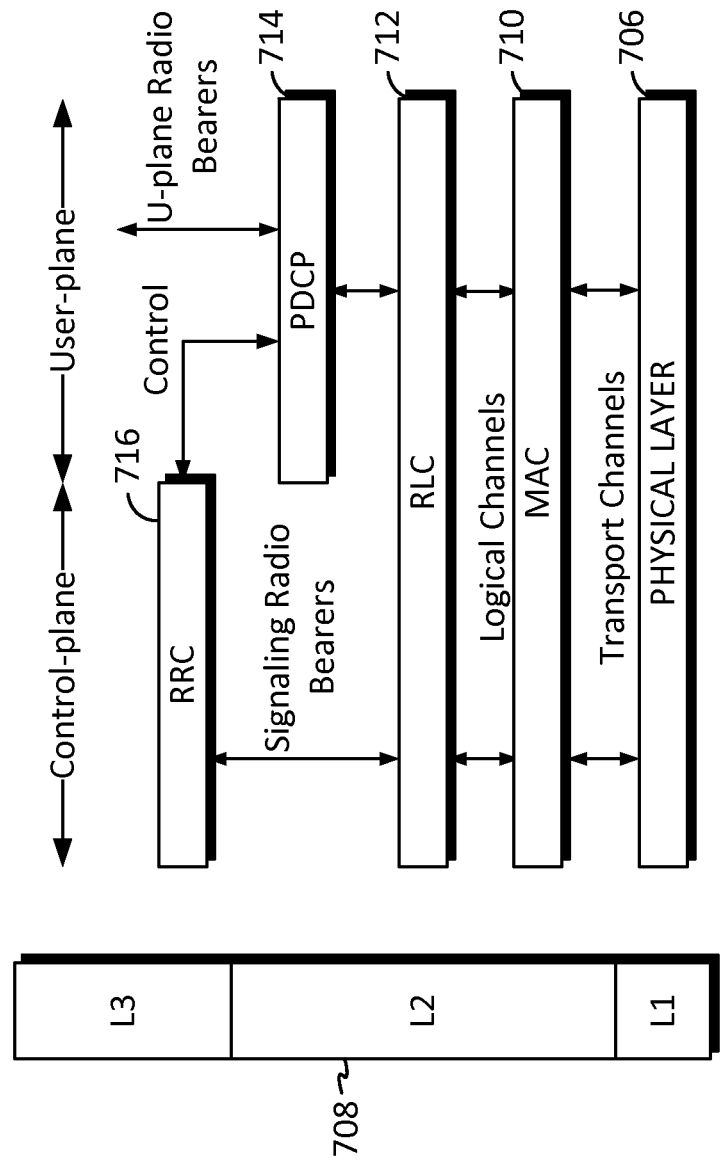
FIG. 7 is a diagram illustrating an example of a radio protocol architecture for the user and control plane.

Turning to FIG. 7, the AS is shown with three layers: Layer 1 (L1), Layer 2 (L2), and Layer 3 (L3). Layer 1 is the lowest layer and implements various physical layer signal processing functions. Layer 1 will be referred to herein as the physical layer 706. The data link layer, called Layer 2 708, is above the physical layer 706 and is responsible for the link between the UE and Node B over the physical layer 706. In one aspect of the disclosure, the protocol stack of FIG. 7 may be implemented by the first RAT access block 104 and/or second RAT access block 106 of FIG. 1.

At Layer 3, the radio resource control (RRC) layer 716 handles the control plane signaling between the UE and the Node B. RRC layer 716 includes a number of functional entities for routing higher layer messages, handling broadcasting and paging functions, establishing and configuring radio bearers, etc.

In the illustrated air interface, the L2 layer 708 is split into sublayers. In the control plane, the L2 layer 708 includes two sublayers: a medium access control (MAC) sublayer 710 and a radio link control (RLC) sublayer 712. In the user plane, the L2 layer 708 additionally includes a packet data convergence protocol (PDCP) sublayer 714. Although not shown, the UE may have several upper layers above the L2 layer 708 including a network layer (e.g., IP layer) that is terminated at a PDN gateway on the network side and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between Node Bs.

The RLC sublayer 712 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities. The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Aspects of the disclosure will be illustrated with a UE 102 (see FIG. 1) capable of simultaneously communicating using two RATs while sharing an RF resource 112 (e.g., a TX chain). In one aspect of the disclosure, the first RAT 108 is W-CDMA, and the second RAT 110 is GSM. When the UE 102 determines that TX contention between W-CDMA and GSM uplink transmission or traffic may occur, the TX sharing manager 114 of the UE 102 may perform certain radio bearer protection mechanisms to prioritize and protect W-CDMA traffic during TX sharing. The radio bearer protection mechanisms will be described in detail below in FIGS. 8-15. An example of determining priority between W-CDMA and GSM traffic at the UE 102 in different TX sharing cases is shown in Table 1 below.

TABLE 1

| CASE | GSM | W-CDMA | TX PRIORITY |
|---|---|---|---|
| 1 | Voice | Idle | W-CDMA-Signaling |
| 2 | Idle | Connected | GSM Signaling |
| 3 | Voice | Connected | W-CDMA Signaling or GSM TX |
| 4 | Idle | Idle | W-CDMA Signaling or GSM Signaling |

The UE 102 may utilize the TX sharing manager 114 to determine the priority of the different RATs. In case 1, when contention occurs between GSM voice traffic and W-CDMA signaling traffic during idle, GSM should yield to W-CDMA signaling. In case 2, when contention occurs between GSM signaling traffic during idle and W-CDMA traffic at a connected state, W-CDMA should yield to GSM signaling. In case 3, when contention occurs between GSM voice traffic and W-CDMA traffic at a connected state, TX priority may be given to W-CDMA signaling or GSM TX. In case 4, when contention occurs between GSM signaling during idle and W-CDMA signaling during idle, TX priority may be given to W-CDMA signaling or GSM signaling. In certain TX sharing situations, the TX sharing manager 114 may provide the W-CDMA side (e.g., First RAT access block 104) of the UE 102 increased priority to protect certain signaling radio bearers and data radio bearers. In other TX sharing situations, the TX sharing manager 114 may provide certain GSM traffic (e.g., voice call) higher priority.

Figure 8:
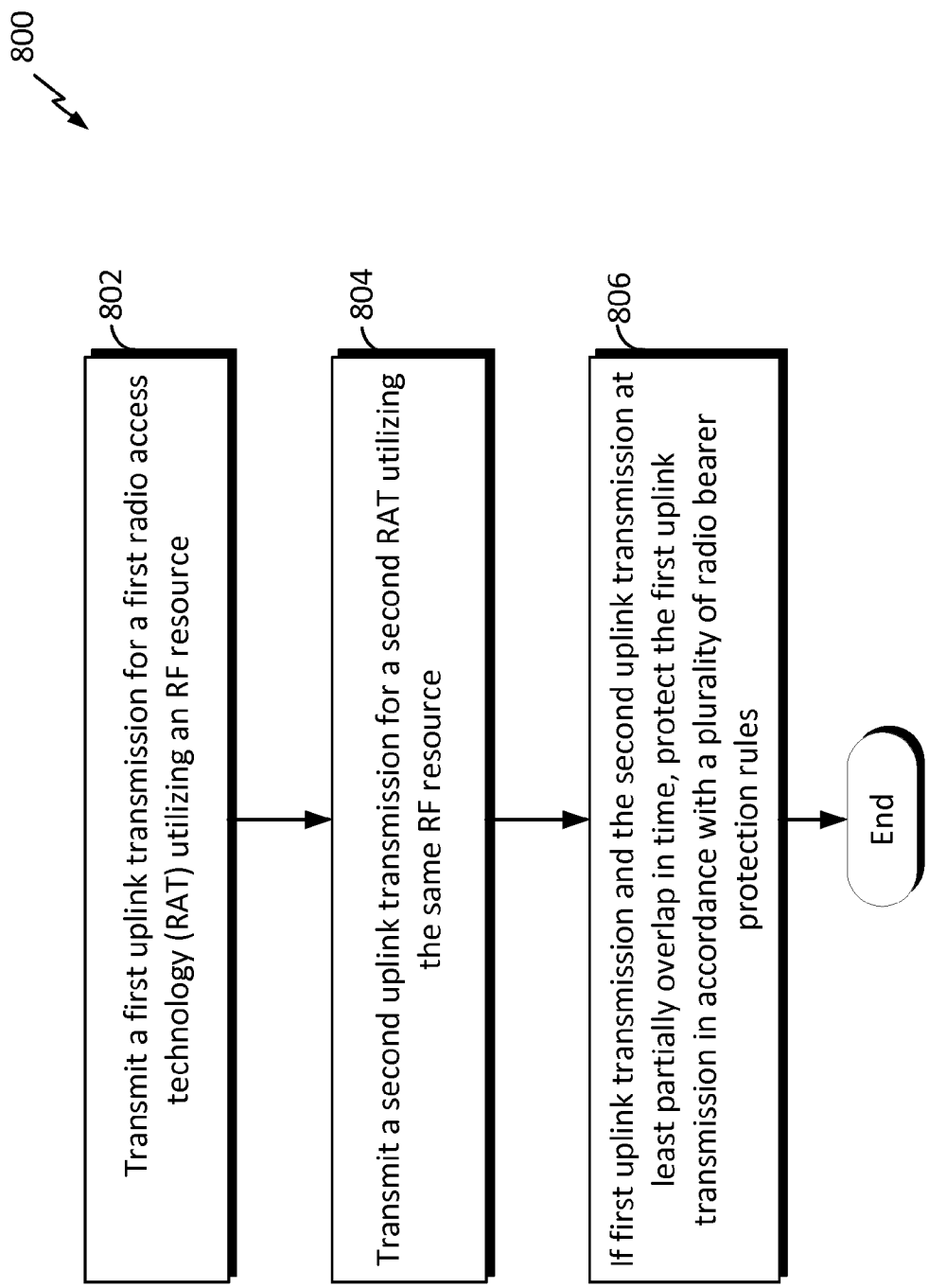
FIG. 8 is a flow chart illustrating a method of protecting W-CDMA radio bearers during W-CDMA/GSM TX sharing in accordance with aspects of the disclosure.

FIG. 8 is a flow chart illustrating a method 800 of protecting W-CDMA radio bearers during W-CDMA/GSM TX sharing in accordance with aspects of the disclosure. The method 800 may be performed by any of the UEs illustrated in FIGS. 1, 4, 5, and/or 6 when executing the RAT access code 414 and TX sharing code 416. In one example, the method 800 may be performed by the UE 102 of FIG. 1. At block 802, the UE 102 transmits a first uplink transmission for a first RAT 108 utilizing an RF resource 112. For example, the RF resource 112 may include one or more filters, amplifiers, mixers, converters, transceivers, low noise amplifiers, and other generally known components for RF communication. At block 804, the UE transmits a second uplink transmission for a second RAT utilizing the same RF resource 112. In one example, the first RAT 108 may be W-CDMA, and the second RAT 110 may be GSM. The first uplink transmission may include one or more SRBs and/or DRBs. At block 806, if a contention occurs between the first uplink transmission and second uplink transmission, the UE 102 protects the first uplink transmission in accordance with a plurality of radio bearer protection rules, which define a number of radio bearer protection operations during TX sharing. For example, the UE may utilize the TX sharing manager 114, which may be the same the TX sharing manager 302, to protect the first uplink transmission such that the first uplink transmission is more likely to be successfully transmitted during TX contention between the two uplink transmissions.

In accordance with the radio bearer protection rules, the UE can set or adjust the priority of the SRBs and/or DRBs in various conditions. These rules may be categorized, for example, as SRB protection rules and DRB protection rules, which will be described in detail below. Referring back to FIG. 3, the TX sharing manager 302 may be configured to implement the SRB protection rules and DRB protection rules in accordance with aspects of the disclosure. These SRB and DRB protection rules when applied may increase the priority of the W-CDMA traffic relative to those of GSM. In some aspects of the disclosure, the TX sharing manager 302 includes an SRB protection block 304 and a DRB protection block 306, which can protect or prioritize the W-CDMA uplink transmission when TX contention occurs between the W-CDMA and GSM uplink transmissions.

SRB Protection

Figure 9:
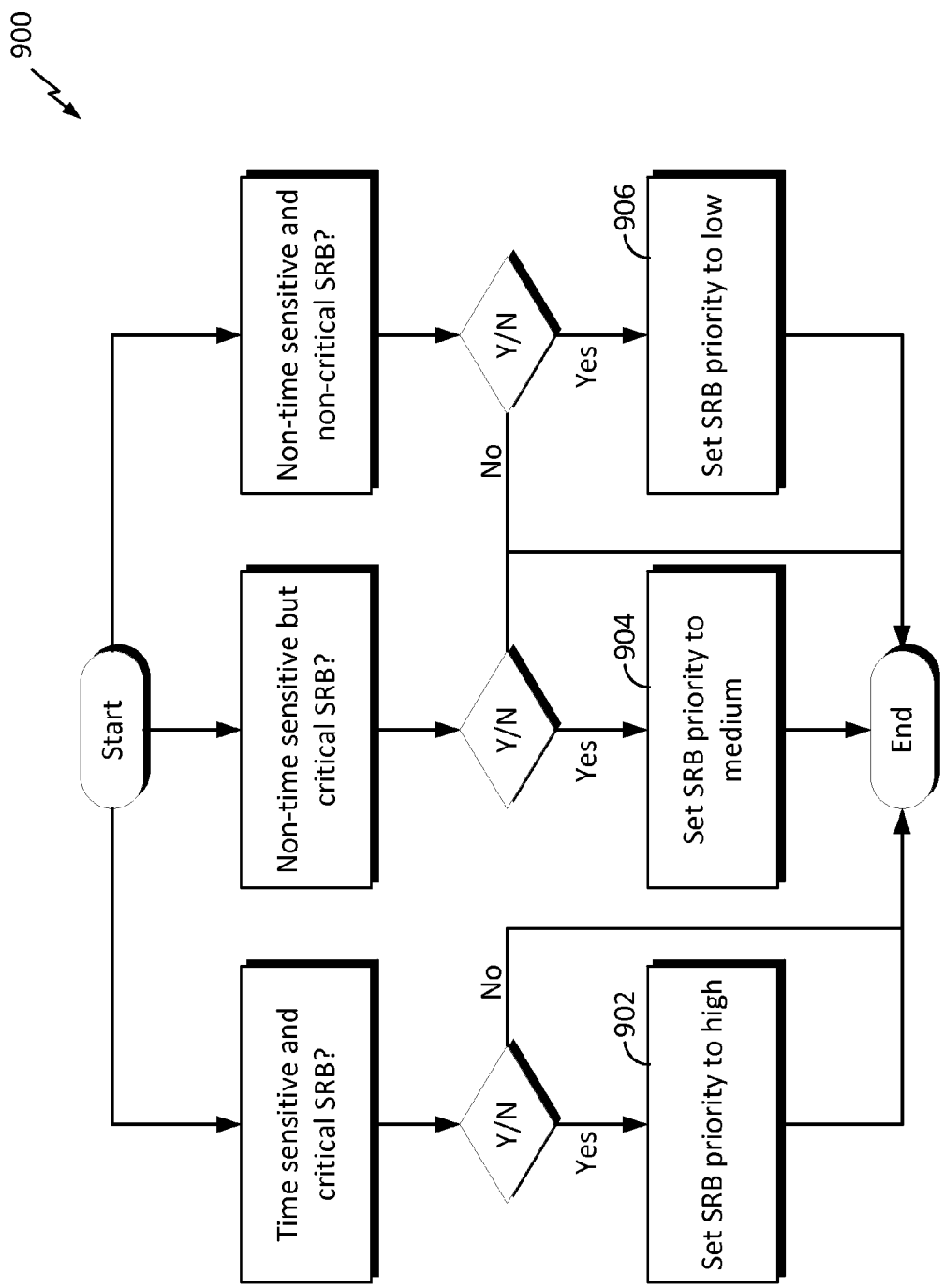
FIG. 9 is a flow chart illustrating a method of setting W-CDMA SRBs with different priority levels in accordance with an aspect of the disclosure.

FIG. 9 is a flow chart illustrating a method 900 of setting W-CDMA SRBs with different priority levels under various conditions in accordance with an aspect of the disclosure. The method 900 may be performed by the SRB protection block 304, for example, in block 806 of FIG. 8. In various aspects of the disclosure, only SRB or DRB protection may be performed, or both SRB and DRB protection may be performed simultaneously or at different time. The SRB protection block 304 includes an SRB priority levels block 308 and an SRB duty cycle block 310. The SRB priority levels block 308 can determine or set three priority levels of W-CDMA SRB protection based on the time-sensitivity and/or criticality of an SRB. The time-sensitivity of an SRB refers to whether or not the SRB has a predetermined timing requirement. The criticality of an SRB refers to the importance of the SRB. In one aspect of the disclosure, the three levels of priority are illustrated in Table 2 below.

TABLE 2

| PRIORITY | APPLICABILITY |
| --- | --- |
| 1 (High) | For time sensitive and critical SRB |
| 2 (Medium) | For non-time sensitive but critical SRB |
| 3 (Low) | For non-time sensitive and non-critical SRB |

At block 902, if an SRB of an uplink transmission is a time sensitive and critical SRB, the SRB protection block 304 assigns a high priority (Priority-1) to this SRB. At block 904, if an SRB of an uplink transmission is a non-time sensitive but critical SRB, the SRB protection block 304 assigns a medium priority (Priority-2) to this SRB. At block 906, if an SRB of an uplink transmission is a non-time sensitive and non-critical SRB, the SRB protection block 304 assigns a low priority (Priority-3) to this SRB. The Priority-3 level may further include a Priority-3 high level and a Priority-3 low level. The time-sensitive and/or criticality of an SRB may be determined in accordance with the RRC performance requirement described in the 3GPP Technical Specification 25.331 Release 12, which is incorporated herein by reference.

Based on the assigned priority level, the SRB protection block 304 can increase the likelihood that the W-CDMA uplink transmission (TX) is protected when TX contention occurs. In one example, when an SRB is assigned a high priority level (Priority-1), the GSM TX yields to the W-CDMA TX. In another example, when an SRB is assigned a low priority level (Priority-3), the W-CDMA TX yields to the GSM TX. In yet another example, when an SRB is assigned a medium priority level (Priority-2), either the W-CDMA TX or GSM TX yield to the other TX. In some examples, the UE may consider other suitable conditions to decide which RAT will have priority during TX sharing.

Examples of Priority-1 SRB Signaling Protection

In one example, the UE may provide Priority-1 SRB signaling protection to W-CDMA uplink transmission to fulfil the W-CDMA RRC N2 timeline. The RRC procedure performance requirement for the RRC N2 timeline is specified in the 3GPP Technical Specification (TS) 25.331, "Radio Resource Control (RRC); Protocol specification," section 13.5, which is incorporated herein by reference in its entirety. A UE needs to satisfy the N2 timer requirement in order to meet the network timeline requirement of some RRC procedures.

In one example, the UE may provide Priority-1 SRB signaling protection to W-CDMA uplink transmission for messages based on the unacknowledged mode (UM) of the RLC. In W-CDMA deployment, some networks may configure the UM RLC mode for certain SRB signaling. For example, the uplink UM RLC mode may be used for a MEASUREMENT REPORT message and an RRC CONNECTION RELEASE COMPLETE message. Both messages are carried by a Dedicated Control Channel (DCCH).

In one example, the UE may provide Priority-1 SRB signaling protection to W-CDMA uplink transmission for messages based on the RLC transparent mode (TM). For example, RLC TM messages may include an RRC CONNECTION REQUEST message, a CELL UPDATE message, and an URA UPDATE message. These messages may be carried by a Common Control Channel (CCCH).

In one example, the UE may provide Priority-1 SRB signaling protection for important W-CDMA NAS message. A non-limiting example of such important W-CDMA NAS message is the AUTHENTICATION RESPONSE NAS message. The W-CDMA NAS may indicate to the RRC and/or Layer 1 (L1) entities of the UE which importance message(s) is to be provided with Priority-1 protection. Other than the AUTHENTICATION RESPONSE message, some other NAS messages may also be protected as Priority-1 depending on their criticality (importance). (For other important W-CDMA NAS messages, see 3GPP TS 24.008, "Mobile radio interface Layer 3 specification; Core network protocols; Stage 3," version 12.5.0, which is incorporated herein by reference in its entirety).

Examples of Priority-2 SRB Signaling Protection

In one example, the UE may provide Priority-2 SRB signaling protection to W-CDMA uplink transmission for which the W-CDMA RRC N2 timer is not used. For example, some non-timing critical W-CDMA RRC messages do not use the N2 timer. For these types of RRC messages, the UE may use Priority-2 SRB protection. Some RRC messages are used in various RRC procedures to transition the UE between different RRC states and modes. The RRC modes include an Idle Mode and an RRC Connected Mode. The RRC Connected Mode has four RRC states, which are URA_CELL, CELL_PCH, CELL_DCH, and CELL_FACH.

Examples of RRC messages/procedures without N2 requirements are RRC Connection Establishment (from Idle Mode to CELL_DCH), Signaling Connection Release procedure, Earthquake and Tsunami Warning System (ETWS) Primary Notification with Security, Radio Bearer Establishment (target state CELL_DCH), Radio Bearer Establishment (from CELL_DCH to CELL_FACH), Radio Bearer Reconfiguration (target state CELL_DCH), Radio Bearer Reconfiguration (from state CELL_FACH to state CELL_FACH), Radio Bearer Reconfiguration (from state CELL_DCH to state CELL_FACH), Radio Bearer Release (from state CELL_DCH to state CELL_FACH), Transport Channel Reconfiguration (target state CELL_DCH), Transport Channel Reconfiguration (from state CELL_DCH to state CELL_FACH), Transport Format Combination Control (transparent mode), Physical Channel Reconfiguration (target state CELL_DCH), Physical Channel Reconfiguration (from state CELL_DCH to state CELL_FACH), Physical Shared Channel Allocation (time-division duplexing (TDD) only), Uplink Physical Channel Control (TDD only), Inter-RAT Handover to UTRAN, and Inter-RAT handover from UTRAN.

In one example, the UE may provide Priority-2 SRB signaling protection for W-CDMA NAS messages of low importance. For example, besides the AUTHENTICATION RESPONSE message, other NAS messages may be considered to be of low importance and provided with Priority-2 protection. (See 3GPP TS 24.008 for other NAS messages). These NAS messages may be used at the radio interface for Call Control (CC), Mobility Management (MM), and Session Management (SM). Some examples of the NAS messages in 3GPP TS 24.008 are illustrated below.

Message Types for Mobility Management

Registration messages:

IMSI DETACH INDICATION
LOCATION UPDATING ACCEPT
LOCATION UPDATING REJECT
LOCATION UPDATING REQUEST

-continued

Security messages:

AUTHENTICATION REJECT
AUTHENTICATION REQUEST
AUTHENTICATION RESPONSE
AUTHENTICATION
FAILURE..............
IDENTITY REQUEST
IDENTITY RESPONSE
TMSI REALLOCATION COMMAND
TMSI REALLOCATION COMPLETE
Connection management messages:

CM SERVICE ACCEPT
CM SERVICE REJECT
CM SERVICE ABORT
CM SERVICE REQUEST
CM SERVICE PROMPT
Reserved (see NOTE)
CM RE-ESTABLISHMENT REQUEST
ABORT
Miscellaneous messages:

MM NULL
MM STATUS
MM INFORMATION

Message Types for Call Control and Call Related SS Messages

Call establishment messages:

ALERTING
CALL CONFIRMED
CALL PROCEEDING
CONNECT
CONNECT ACKNOWLEDGE
EMERGENCY SETUP
PROGRESS
CC-ESTABLISHMENT
CC-ESTABLISHMENT CONFIRMED
RECALL
START CC
SETUP
Call information phase messages:

MODIFY
MODIFY COMPLETE
MODIFY REJECT
USER INFORMATION
HOLD
HOLD ACKNOWLEDGE
HOLD REJECT
RETRIEVE
RETRIEVE ACKNOWLEDGE
RETRIEVE REJECT
Call clearing messages:

DISCONNECT
RELEASE
RELEASE COMPLETE
Miscellaneous messages:

CONGESTION CONTROL
NOTIFY
STATUS
STATUS ENQUIRY
START DTMF
STOP DTMF
STOP DTMF ACKNOWLEDGE
START DTMF ACKNOWLEDGE
START DTMF REJECT
FACILITY

Message Types for GPRS Mobility Management

Mobility management messages

Attach request
Attach accept
Attach complete
Attach reject
Detach request
Detach accept
Routing area update request
Routing area update accept
Routing area update complete
Routing area update reject
Service Request
Service Accept
Service Reject
P-TMSI reallocation command
P-TMSI reallocation complete
Authentication and ciphering req
Authentication and ciphering resp
Authentication and ciphering rej
Authentication and ciphering failure
Identity request
Identity response
GMM status
GMM information Message Types for GPRS Session Management Session management messages Activate PDP context request
Activate PDP context accept
Activate PDP context reject
Request PDP context activation
Request PDP context activation rej.
Deactivate PDP context request
Deactivate PDP context accept
Modify PDP context request(Network to MS direction)
Modify PDP context accept (MS to network direction)
Modify PDP context request(MS to network direction)
Modify PDP context accept (Network to MS direction)
Modify PDP context reject
Activate secondary PDP context request
Activate secondary PDP context accept
Activate secondary PDP context reject
Reserved: was allocated in earlier phases of the protocol
Reserved: was allocated in earlier phases of the protocol
Reserved: was allocated in earlier phases of the protocol
Reserved: was allocated in earlier phases of the protocol
Reserved: was allocated in earlier phases of the protocol
SM Status Activate MBMS Context Request
Activate MBMS Context Accept
Activate MBMS Context Reject
Request MBMS Context Activation
Request MBMS Context Activation Reject
Request Secondary PDP Context Activation
Request Secondary PDP Context Activation Reject
Notification Examples of Priority-3 SRB Signaling Protection As described before, when an RRC MEASUREMENT REPORT is transmitted using RLC UM, the UE may provide such message with the Priority-1 protection. In another example, when an RRC MEASUREMENT REPORT is transmitted using RLC AM, the UE may provide such message with the Priority-3 protection. The network may be configured to use either RLC UM or RLC AM for the RRC MEASUREMENT REPORT. In one example, the UE may provide Priority-3 high level SRB signaling protection for RRC MEASUREMENT REPORTS of high importance. In addition, the UE may provide Priority-3 low level SRB signaling protection for RRC MEASUREMENT REPORTS of low importance. In one aspect of the disclosure, for each RRC MEASUREMENT REPORT, the W-CDMA RRC may indicate the appropriate priority level to the W-CDMA L1 for the desired SRB protection level. For example, the priority-3 high priority may be used for intra-frequency measurement reports and inter-frequency measurement reports. The priority-3 high priority may also be used for certain Inter-RAT measurement reports including reports for Event 3a, 3b, 3c, and 3d. The priority-3 low priority may be used for traffic volume measured Inter-RAT measurement report.

TTI Blanking Duty Cycle

Figure 10:
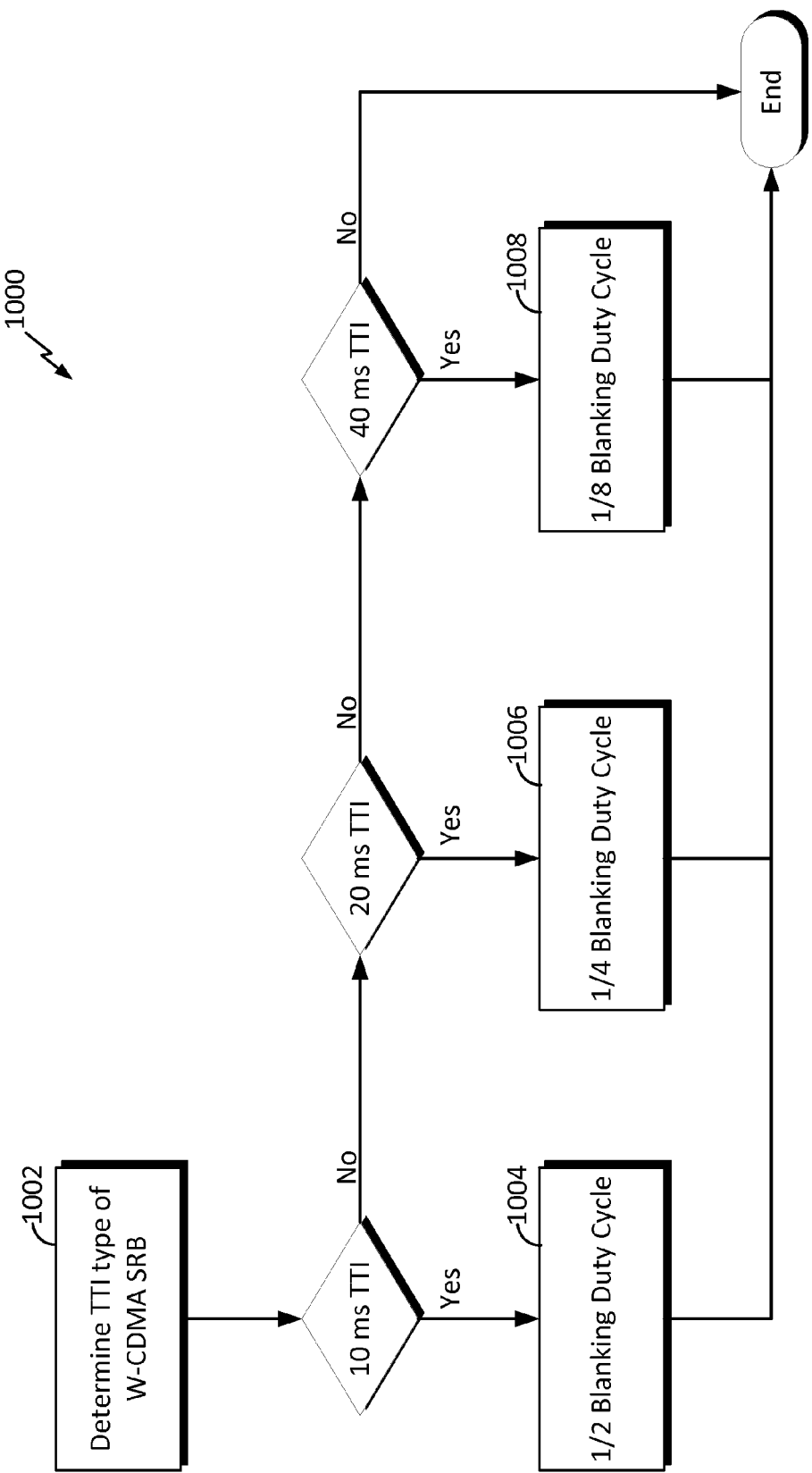
FIG. 10 is a flow chart illustrating a method of providing SRB signaling protection based on the types of W-CDMA uplink transmission time interval (TTI) configurations in accordance with an aspect of the disclosure.

FIG. 10 is a flow chart illustrating a method 1000 of providing SRB signaling protection based on the types of W-CDMA uplink TTI configurations in accordance with an aspect of the disclosure. For example, a W-CDMA Rel-99 SRB can have four types of uplink DPCH transport TTI lengths (e.g., 10 ms TTI, 20 ms TTI, 40 ms TTI, and 80 ms TTI). Among them, 10 ms, 20 ms, and 40 ms TTIs are more commonly deployed than 80 ms TTI. Therefore, in one aspect of the disclosure, the UE may provide 10, 20, and/or 40 ms TTIs with SRB protection during TX sharing operation. Referring to FIG. 10, at block 1002, the W-CDMA RRC and/or MAC may detect the SRB TTI type and take that into account in order to determine a suitable TX blanking duty cycle, which may be a configurable variable. The chosen blanking duty cycle may determine the SRB protection priority (e.g., Priority-1, 2, 3-high, or 3-low) for the particular TTI. For example, the UE may utilize the duty cycle block 310 (see FIG. 3) to provide SRB protection based on the types of TTI blanking duty cycle. At block 1004, the duty cycle block 310 may protect a 10 ms TTI SRB by using a ½ TX blanking duty cycle. AT block 1006, the duty cycle block 310 may protect a 20 ms TTI SRB by using a ¼ TX blanking duty cycle. At block 1008, the duty cycle block 310 may protect a 40 ms TTI SRB by using a ⅛ TX blanking duty cycle. In other aspects of the disclosure, the concept of FIG. 10 may be applied to other TTI durations such as 2 ms TTI, etc.

Figure 11:
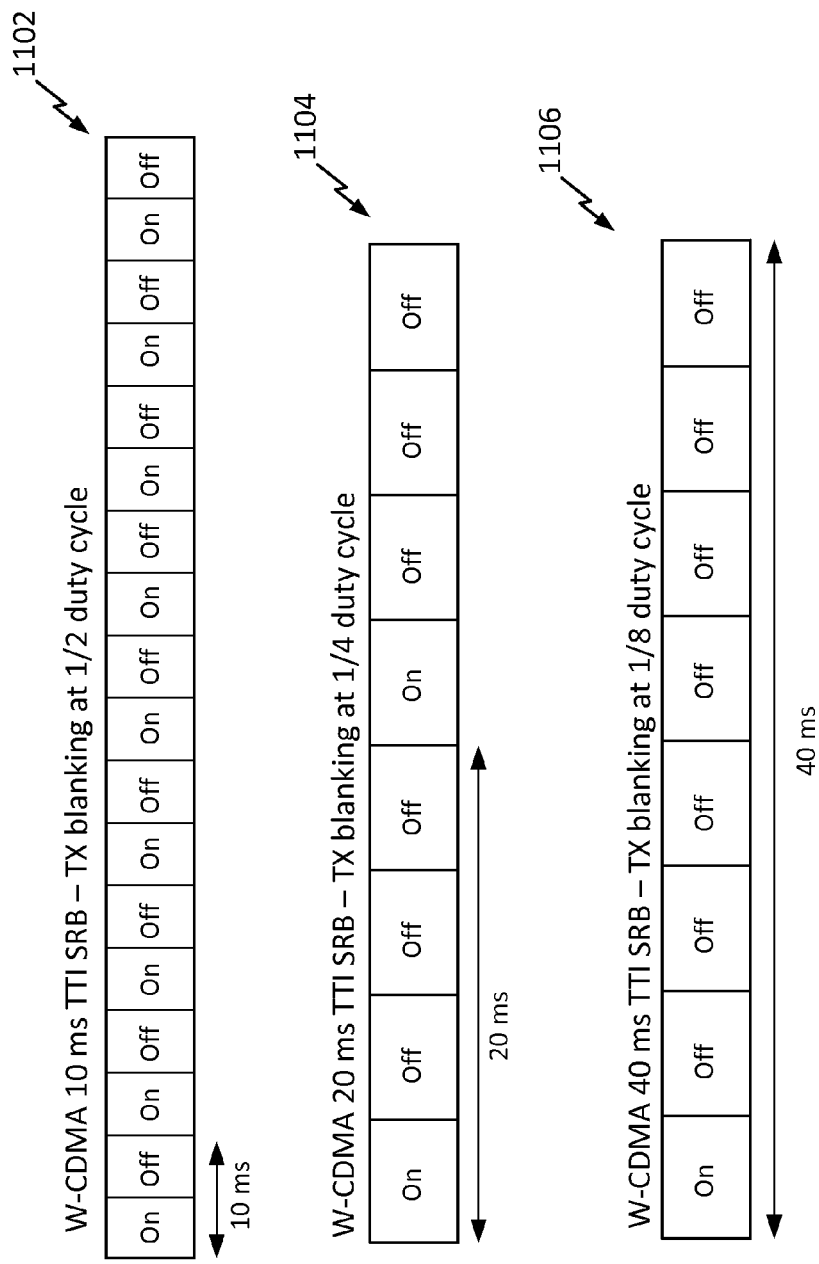
FIG. 11 is a diagram illustrating three types of TTI blanking configurations for W-CDMA SRB protection in accordance with an aspect of the disclosure.

FIG. 11 is a diagram illustrating three types of SRB TTI blanking configurations in accordance with an aspect of the disclosure. Three TTI blanking configurations 1102, 1104, and 1106 are shown for 10 ms, 20 ms, and 40 ms TTIs, respectively. In the ON duration of a duty cycle of an SRB, the SRB protection priority may be higher; and in the OFF duration of the duty cycle, the protection priority may be one level lower than that of the ON duration. In one aspect of the disclosure, the priority of the SRB (e.g., Priority-1, 2, 3-high, or 3-low) during the ON cycle and OFF cycle may be determined as described above in relation to FIG. 9. During the ON durations, the SRB should not be blanked.

DRB Protection

The UE 102 may provide various DRB protection for W-CDMA user traffic. For example, a UE may utilize the DRB protection block 306 of FIG. 3 to provide a number of DRB protections that will be described in detail below.

Figure 12:
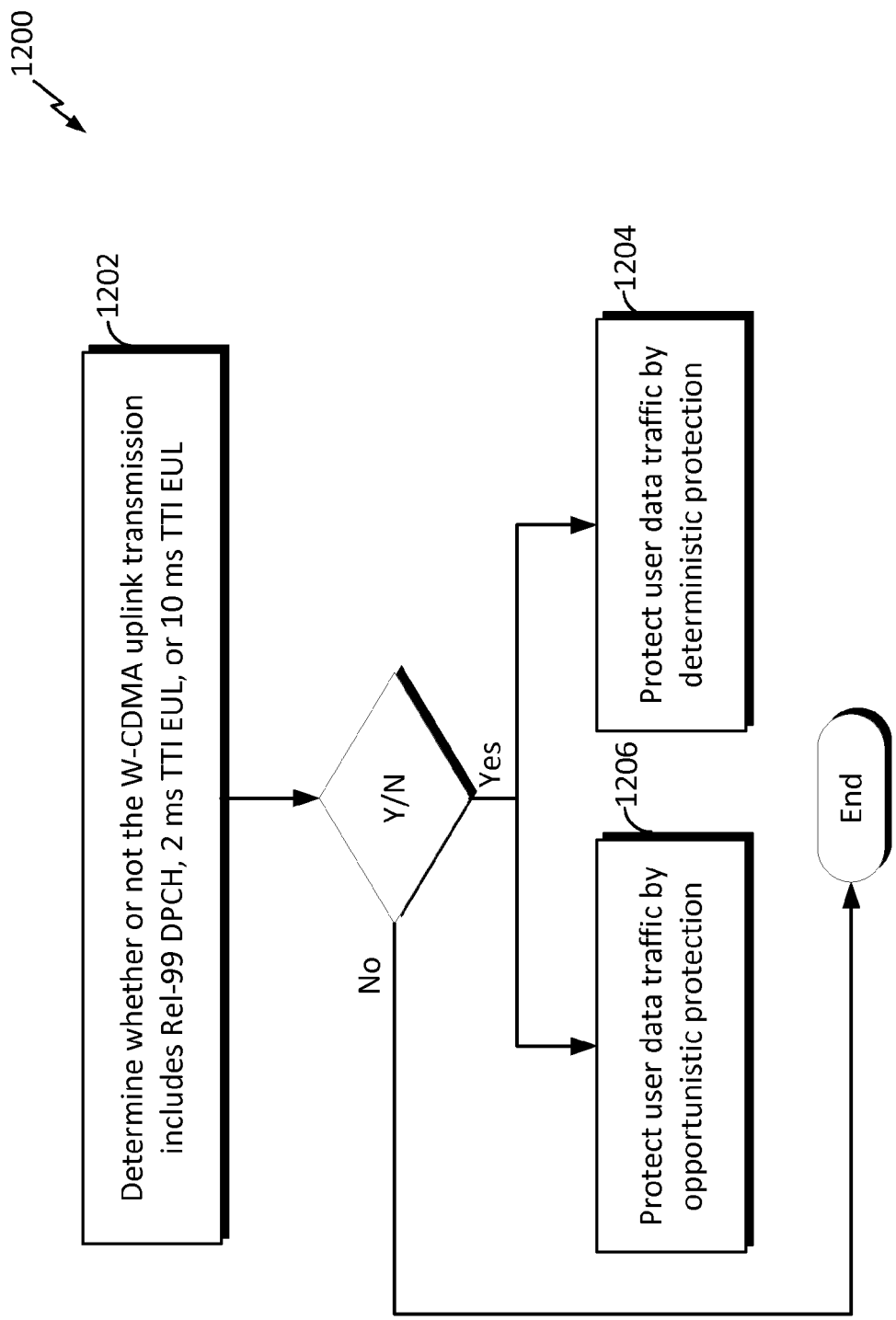
FIG. 12 is a flow chart illustrating a method of protecting W-CDMA DRB using opportunistic or deterministic protection in accordance with an aspect of the disclosure.

FIG. 12 is a flow chart illustrating a method 1200 of protecting W-CDMA DRBs using opportunistic protection or deterministic protection in accordance with an aspect of the disclosure. In general, deterministic protection refers to the various techniques for handling the W-CDMA DRBs in co-ordination with the TX timing of the other RAT (e.g., GSM). Opportunistic protection refers to the various techniques for handing the W-CDMA DRBs without specific coordination with the TX of the other RAT. The method 1200 may be performed by any of the UEs illustrated in FIGS. 1, 4, 5, and/or 6. For example, the UE may utilize the DRB protection block 306 to perform the method 1200, for example, in block 806 of FIG. 8. At block 1202, the UE determines whether or not the W-CDMA uplink transmission includes Rel-99 DPCH, 2 ms TTI EUL, or 10 ms TTI EUL. The EUL may be referred as HSUPA in some literature. The W-CDMA RRC, RLC, and/or MAC of the UE may determine which type of uplink transport channel is in the current uplink transmission, and provide that information to the W-CDMA L1 to trigger a corresponding DRB protection, which will be described in more detail below. In this particular example, the UE provides DRB protection for Rel-99 DPCH, 2 ms TTI EUL, and 10 ms TTI EUL. These three types of uplink transport channels can have significant impact on the uplink data bearer (DB) due to TX sharing. In other examples, the UE may provide DRB protection to other suitable user traffic or uplink transport channels.

The UE may provide user data traffic protection on two levels: (1) deterministic protection and (2) opportunistic protection. The goal of deterministic protection is to ensure the successful transmission of W-CDMA uplink data based on a timing of the GSM TX timing. Opportunistic protection is to perform opportunistic W-CDMA uplink transmission without prior knowledge or early notification of GSM TX timeline. For example, the UE may utilize the protection type block 312 (see FIG. 3) to determine which of the deterministic protection or opportunistic protection is utilized to protect certain DRBs. In one aspect of the disclosure, if GSM TX timing is available, the UE may perform deterministic protection. For example, a TX sharing manager (e.g., a TX sharing manager block 114 of FIG. 1) of the UE may receive GSM TX timing from the GSM side of the UE. In another aspect of the disclosure, if GSM TX timing is not available, the UE may perform opportunistic protection.

Figure 13:
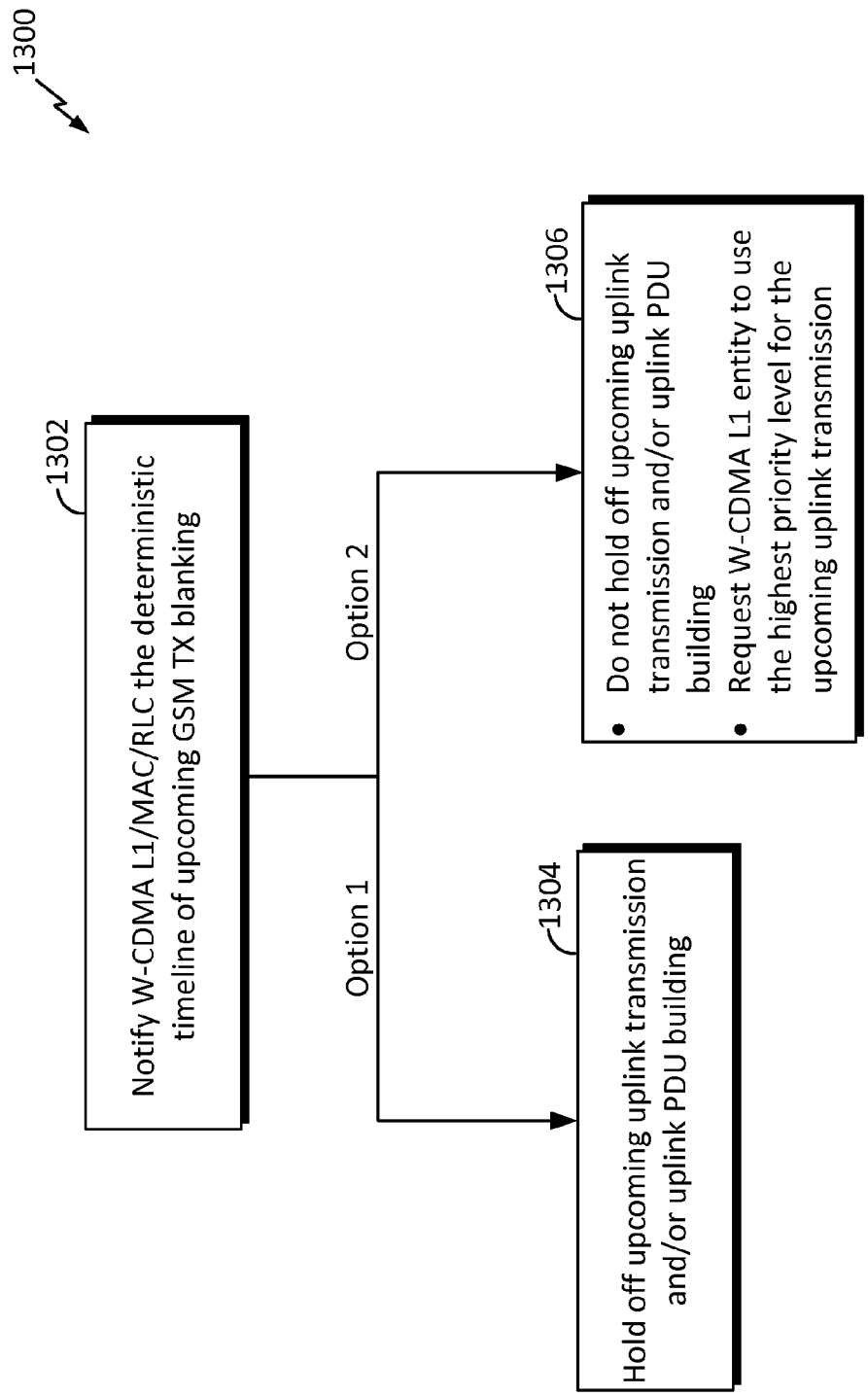
FIG. 13 is a flow chart illustrating a method of deterministic protection for DRBs in accordance with an aspect of the disclosure.

At block 1204, the UE may use deterministic GSM TX blanking time information to determine the timeline of upcoming TX blanking(s) for deterministic protection. Deterministic protection is used to ensure successful or deterministic transmission of certain W-CDMA traffic. FIG. 13 is a flow chart illustrating a method 1300 of deterministic protection for DRBs in accordance with an aspect of the disclosure. In general, deterministic protection involves three steps. At block 1302, the TX sharing block 302 (see FIG. 3) notifies the W-CDMA L1, MAC, and/or RLC the deterministic timeline of upcoming GSM TX blanking. The early notification may be available in advance by a suitable number of TTIs before the upcoming transmission that may occur. For example, the GSM side may provide early notification on the upcoming GSM TX blanking time. At block 1304 (option 1), based on the early notification, the W-CDMA L1, MAC, and/or RLC hold off (e.g., completely hold off) upcoming W-CDMA uplink transmission and/or uplink PDU building. Alternatively, at block 1306 (option 2), the W-CDMA L1, MAC, and/or RLC do not hold off upcoming uplink transmission and/or uplink PDU building. Instead, the W-CDMA L1, MAC, and/or RLC may request the W-CDMA L1 to use the highest priority level (e.g., Priority-1) for the upcoming uplink transmission. The UE may implement at least one of the option 1, option 2, or both options. If both options are implemented, the UE may perform option 2 instead of option 1 when it is undesirable to hold off or delay the uplink transmission and/or uplink PDU building.

In one aspect of the disclosure, the UE protects user data traffic by opportunistic protection without prior knowledge or precise early notification of GSM TX timeline, for example, utilizing the TX sharing manager 302, to perform opportunistic transmission. In opportunistic transmission, for every uplink transmission, the W-CDMA uplink RLC, MAC, and/or L1 build their PDUs and determine the desired protection priority for the uplink transmission without considering GSM TX timing. The protection priority (e.g., Priority-1, 2, or 3) may be determined by the W-CDMA MAC based on factors such as transmission duty cycle, time-sensitivity, etc.

In one aspect of the disclosure, the UE may provide opportunistic data protection for 2 ms TTI EUL transmissions, by reducing the transmission duty cycle. It is similar to the SRB protection described in relation to FIGS. 10 and 11. For example, in the ON duration of a duty cycle of a DRB, the DRB protection priority may be higher and the transmission of the other RAT may be blanked; and in the OFF duration of the duty cycle, the protection priority may be one level lower than that of the ON duration. During the ON durations, the DRB is not blanked. For example, the W-CDMA RLC, MAC, and/or L1 may determine the W-CDMA transmission duty cycle to increase or decrease protection priorities. The duty cycle may be a W-CDMA configuration variable.

In one aspect of the disclosure, the UE may provide opportunistic data protection for 10 ms TTI EUL transmission, by reducing an Enhanced Transport Format Combination Indicator (E-TFCI) selection by a suitable reduction factor for EUL HARQ transmissions/retransmissions. The reduction factor is a ratio applied to the selected E-TFCI power offset. For example, the UE may utilize an E-TFCI selection reduction factor block 314 (see FIG. 3) for determining the reduction factor and reducing the E-TFCI selection. Reducing TFCI selection will reduce the transport block size. The uplink enhanced dedicated channel (E-DCH) Transport Format Combination Indication (E-TFCI) identifies the transport format (e.g., transport block size) of the associated EUL transmission. Using a smaller transport block size for the EUL transmission can reduce the time duration that the EUL transmission will be in TX conflict with the transmission of the other RAT. Upon HARQ transmission failure, the W-CDMA MAC may determine to reduce the E-TFCI selection for the new transmission. The E-TFCI selection reduction factor for HARQ retransmission may be a W-CDMA configuration variable. In one aspect of the disclosure, the reduction factor may be based on a TX blanking percentage within one TTI duration of EUL. In one example, the TX blanking percentage is the on-off (blanking) duty cycle ratio of the EUL in one TTI. In another aspect of the disclosure, the reduction factor may be based on a statistical TX blanking percentage of an entire EUL transmission duration. In one example, the statistical TX blanking percentage is the average on-off (blanking) duty cycle ratio of the EUL over a number of TTIs. In a non-limiting example, the reduction factor may be ½.

In one aspect of the disclosure, the UE may provide opportunistic data protection for a Rel-99 DPCH uplink transmission, by increasing a power gain factor for a suitable amount. Upon RLC transmission failure, the W-CDMA MAC may determine to increase the Rel-99 DPCH power gain factor (or power offset) for the retransmission. The Rel-99 DPCH power gain factor may be a W-CDMA configuration variable. Increasing the power gain factor of the Rel-99 DPCH will cause the UE to allocate more power to the Rel-99 DPCH uplink transmission. It will result in a higher probability that a partial data unit is transmitted and better recovery. In one aspect of the disclosure, the UE may utilize a Rel-99 DPCH power gain block 316 (see FIG. 3) for determining the increased Rel-99 DPCH power gain factor.

In one aspect of the disclosure, the UE may provide high priority opportunistic data protection for time-sensitive uplink traffic. For example, the W-CDMA RRC, RLC, and/or MAC may determine that time-sensitive data traffic is in the uplink transmission, and increase its protection priority (e.g., Priority-1). Time-sensitive data traffic refers to, for example, SRB data that has a predetermined timing requirement. Examples of time-sensitive data traffic include IP Media System (IMS) signaling, Transmission Control Protocol (TCP) acknowledgment, RLC control PDUs, etc.

Figure 14:
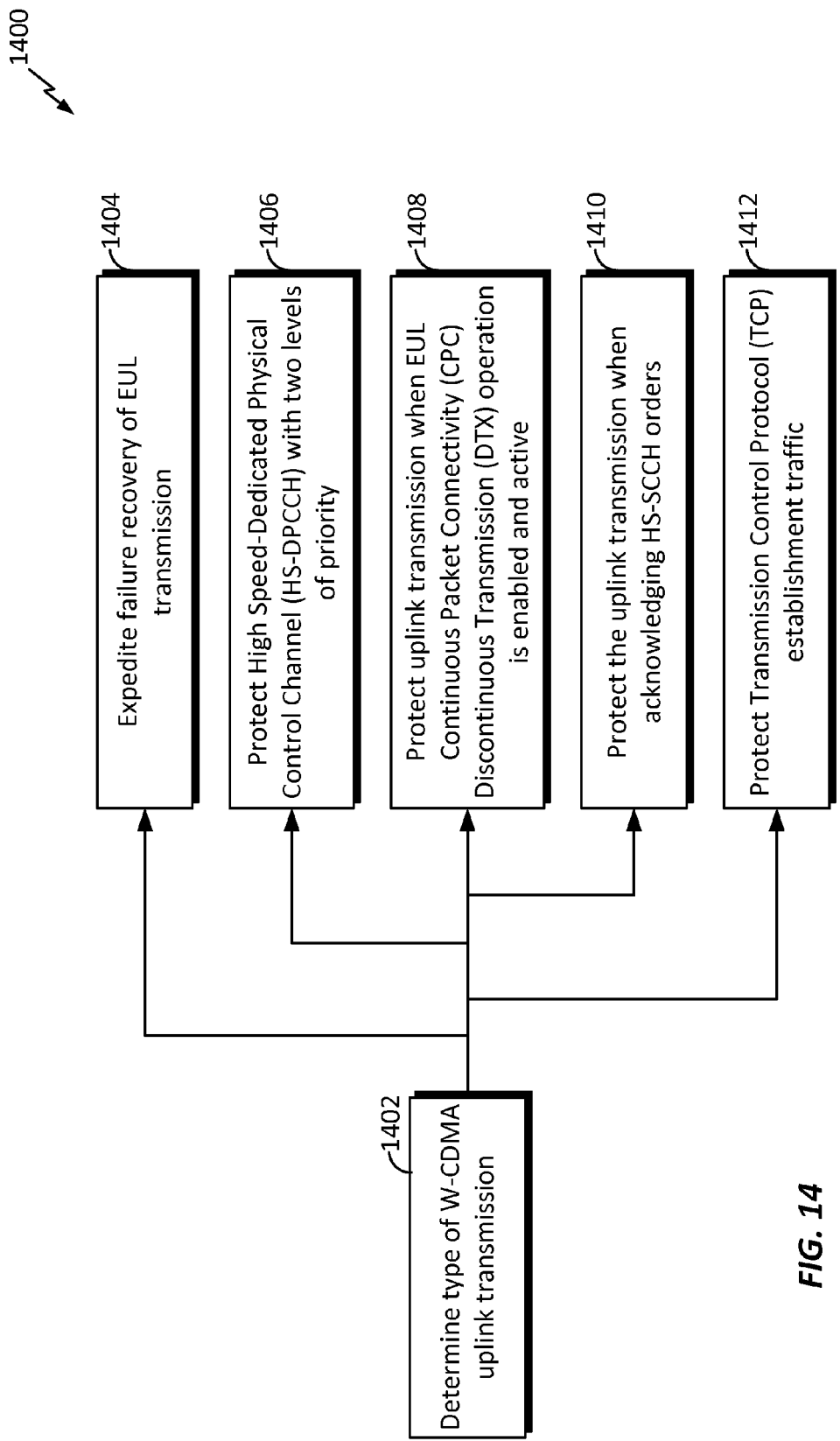
FIG. 14 is a flow chart illustrating additional DRB protections in accordance with some aspects of the disclosure.

FIG. 14 is a flow chart illustrating additional DRB protections 1400 in accordance with some aspects of the disclosure. These DRB protections 1400 may be performed by any of the UEs illustrated in FIGS. 1, 4, 5, and/or 6. For example, the UE may utilize the DRB protection block 306 to perform these DRB protections, for example, in block 806 of FIG. 8. At block 1402, the UE determines the type of W-CDMA uplink transmission. Some non-limiting examples of the type of uplink transmission include 2 ms TTI EUL, 10 ms TTI EUL, High Speed-Dedicated Physical Control Channel (HS-DPCCH), EUL Continuous Packet Connectivity (CPC) Discontinuous Transmission (DTX) operation, acknowledgement to High Speed Signaling Control Channel (HS-SCCH) orders, or Transmission Control Protocol (TCP) establishment traffic.

In one aspect of the disclosure, at block 1404, the UE may expedite failure recovery of an EUL (e.g., 2 ms TTI and/or 10 ms TTI) transmission, by triggering early notification from the MAC-i/e entity to the RLC, upon HARQ retransmission exhaustion. For example, the W-CDMA MAC determines that all needed HARQ retransmissions have been exhausted and/or failed. Upon that determination, the W-CDMA MAC notifies the RLC to trigger an RLC layer retransmission, irrespective of the RLC configuration of status request, status polling trigger, or relevant RLC timers. Upon the above early notification from the MAC, the RLC autonomously triggers uplink RLC retransmission. Therefore, an RLC retransmssion will occur earlier than that of the known technique such that a failed EUL uplink can recover faster (i.e., protected).

In another aspect of the disclosure, the UE may expedite failure recovery of an EUL (e.g., 2 ms TTI and 10 ms TTI) transmission, by triggering RLC polling, upon HARQ retransmission exhaustion. For example, the W-CDMA MAC determines that all needed HARQ retransmissions have been exhausted and/or failed. Upon that determination, the W-CDMA MAC notifies the RLC to trigger RLC layer retransmission, irrespective of the RLC configuration of status request, status polling trigger, or relevant RLC timers. Upon the early notification from the MAC, the RLC autonomously triggers uplink RLC retransmission. The RLC may also start polling the status of PDUs that have been (re) transmitted, irrespective of the RLC configuration of status request, status polling trigger, or relevant RLC timers. Therefore, an RLC retransmssion will occur earlier than that of the known technique such that a failed EUL uplink can recover faster (i.e., protected).

In one aspect of the disclosure, at block 1406, the UE may protect the High Speed-Dedicated Physical Control Channel (HS-DPCCH) with two levels of priority (Priority-1 (high) and Priority-2 (low)). For example, the UE may utilize an HS-DPCCH protection priority level and power gain factor block 318 (see FIG. 3) and/or W-CDMA L1/MAC to provide the two levels of priority for protecting HS-DPCCH traffic. For example, the W-CDMA L1 and/or MAC may send the request to the TX sharing manager 302 with the appropriate priority level when the uplink transmission on the HS-DPCCH is transmitted. In one example, if the UE needs to send HARQ acknowledgement (ACK) or not-acknowledgement (NACK) of High-speed Downlink Shared Channel (HS-DSCH) and Channel Quality Indicator (CQI), the UE may use Priority-1 HS-DPCCH protection. In another example, if the UE needs to send only the CQI, the UE may use Priority-2 HS-DPCCH protection. Using the Priority-1 priority causes the UE to provide the HS-DPCCH transmission with higher priority over a competing TX transmission of the other RAT, thus protecting the HS-DPCCH transmission.

In one aspect of the disclosure, when the UE sends only the CQI, the UE may not send HS-DPCCH traffic at all (e.g., set power gain factor Beta(hs)=0). In another aspect of the disclosure, when the UE sends only the CQI, the UE may use a longer cycle of CQI feedback (irrespective of the configuration of CQI feedback cycle determined by the network). For example, the UE may utilize a CQI feedback cycle block 320 (see FIG. 3) to determine a suitable CQI feedback cycle. With a longer CQI cycle, the CQI will be sent less frequently. Therefore, the DRB is less affected (i.e., protected).

In one aspect of the disclosure, when the UE uses Priority-2 HS-DPCCH protection, the UE may increase the power gain for the HS-DPCCH (e.g., increase power gain factor Beta(hs)). The UE may utilize the HS-DPCCH protection priority level and power gain factor block 318 to control the power gain of the HS-DPCCH. Increasing the power of the HS-DPCCH will increase the chance that the transmission will be successfully completed.

In one aspect of the disclosure, at block 1408, the UE may provide Priority-1 (high) data protection for the uplink transmission when EUL Continuous Packet Connectivity (CPC) Discontinuous Transmission (DTX) operation is enabled and active such that the probability of successful uplink CPC DTX transmission may be increased. Using the Priority-1 priority causes the UE to provide the CPC DTX transmission with higher priority over a competing TX transmission of the other RAT, thus protecting the CPC DTX transmission. The W-CDMA MAC and/or L1 entities may determine if CPC DTX is enabled and notify the TX sharing manager 302 to increase protection priority to Priority-1.

In one aspect of the disclosure, at block 1410, the UE may provide Priority-1 (high) data protection for the uplink transmission when the UE is acknowledging HS-SCCH orders to the network such that the probability of a successful ACK to HS-SCCH orders may be increased. HS-SCCH orders are used by the network to activate or deactivate the uplink DTX and/or downlink DRX by sending them as L1 signaling commands to the UE. The W-CDMA L1 may determine if the UE is acknowledging the HS-SCCH orders and notify the TX sharing manager 302 to increase protection priority to Priority-1 for the uplink transmission. Using the Priority-1 priority causes the UE to provide the ACK transmission with higher priority over a competing TX transmission of the other RAT, thus protecting the ACK transmission.

In one aspect of the disclosure, at block 1412, the UE may provide Priority-1 (high) data protection for Transmission Control Protocol (TCP) establishment traffic (e.g., SYN, SYN/ACK, ACK), by inspecting a TCP packet size. When TCP establishment traffic packets are detected, the W-CDMA L1 and/or the TX sharing manager 302 may increase data protection priority of the uplink transmission to Priority-1. Using the Priority-1 priority causes the UE to provide the TCP establishment traffic with higher priority over a competing TX transmission of the other RAT, thus protecting the TCP establishment traffic. The TCP standard is defined in the Request for Comment (RFC) standards document number 793, Transmission Control Protocol, by the Internet Engineering Task Force (IETF) (September 1981), which is incorporated herein by reference.

Figure 15:
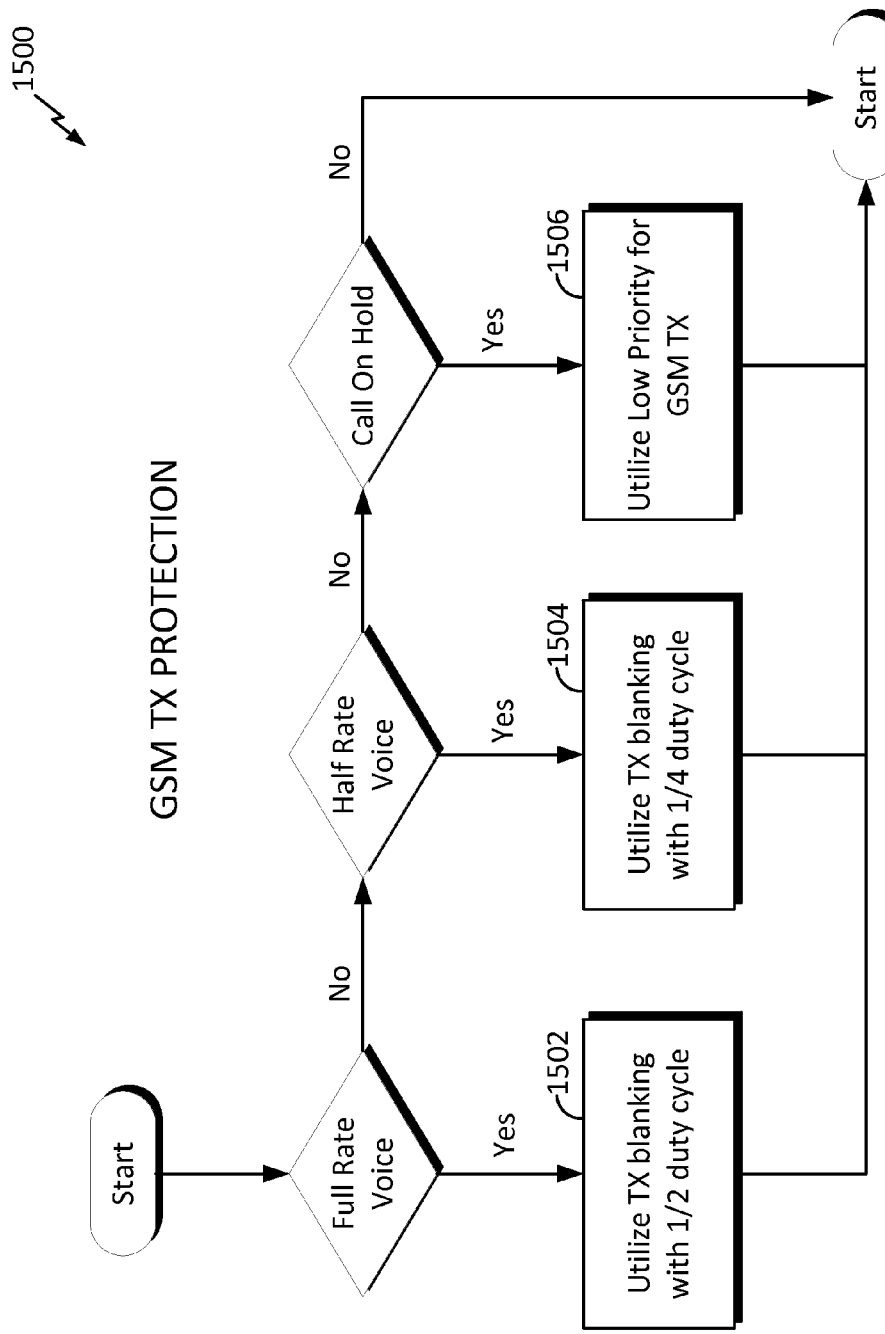
FIG. 15 is a flow chart illustrating a GSM data protection method in accordance with an aspect of the disclosure.

FIG. 15 is a flow chart illustrating a GSM TX protection method 1500 in accordance with an aspect of the disclosure. The method 1500 may be performed by any of the UEs illustrated in FIGS. 1, 4, 5, and/or 6. In one example, the UE may utilize the GSM protection block 322 of FIG. 3 to perform the GSM TX protection method 1500. The UE may provide GSM TX protection based on the state of GSM voice activity (e.g., full rate, half rate, or on-hold) to reduce unnecessary GSM TX blanking. In this case, GSM TX protection may be prioritized depending on the state of GSM voice activity. At block 1502, for full rate GSM voice, the UE may utilize a GSM TX blanking duty cycle of X. In one example, X may be ½. At block 1504, for half rate GSM voice, the UE may utilize a GSM TX blanking duty cycle of Y. In one example, Y may be ¼. At block 1506, for on-hold GSM call, the UE may use low priority (e.g., Priority-3) protection for the GSM TX. Therefore, GSM TX may be protected based on the state of the call. The TX blanking duty cycles of the GSM TX in FIG. 15 are only illustrative in nature, and other suitable blanking duty cycles may be used in other examples.

Several aspects of a telecommunications system have been presented with reference to a W-CDMA/GSM system. The various SRB and DRB protections described in FIGS. 8-15 may be applied individually and/or in different combinations including some or all of the SRB and DRB protections. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at a user equipment (UE), comprising:
   transmitting, at a user equipment (UE), a first uplink transmission for a first radio access technology (RAT) utilizing a shared transmission resource of the UE, wherein the first uplink transmission comprises at least one of a signaling radio bearer (SRB) or a data radio bearer (DRB);
   transmitting, at the UE, a second uplink transmission for a second RAT utilizing the shared transmission resource; and
   if the first uplink transmission and the second uplink transmission at least partially overlap in time, protecting the first uplink transmission in accordance with one or more radio bearer protection rules, comprising:
      protecting the SRB by setting a priority of the SRB based on a time-sensitivity and criticality of the SRB, and
      protecting the DRB by utilizing opportunistic protection without considering a timing of the second uplink transmission.

2. The method of claim 1, wherein the protecting the first uplink transmission comprises at least one of:
   setting a blanking duty cycle of the SRB based on a transmission time interval (TTI) of the SRB; or
   protecting the DRB by utilizing deterministic protection based on a timing of the second uplink transmission.

3. The method of claim 1, wherein the protecting the first uplink transmission comprises protecting the DRB by deterministic protection, comprising:
   holding off upcoming transmission or protocol data unit (PDU) building of the DRB based on a timing of the second uplink transmission, or
   increasing a priority of the upcoming transmission of the DRB without considering a timing of the second uplink transmission.

4. The method of claim 1, wherein the protecting the first uplink transmission comprises protecting the DRB by opportunistic protection, comprising:
   reducing a duty cycle of the first uplink transmission, wherein the first uplink transmission has a higher priority in an ON cycle relative to that of an OFF cycle of the duty cycle.

5. The method of claim 1, wherein the protecting the first uplink transmission comprises protecting the DRB by opportunistic protection, comprising:
   reducing an Enhanced Transport Format Combination Indicator (E-TFCI) in accordance with a reduction factor,
   wherein the reduction factor is based on at least one of:
      a blanking percentage within a transmission time interval (TTI) of the first uplink transmission, or
      a statistical blanking percentage of the first uplink transmission.

6. The method of claim 1, wherein the protecting the first uplink transmission comprises protecting the DRB by opportunistic protection, comprising:
   in response to a transmission failure of the first uplink transmission, increasing a power gain factor of a retransmission of the first uplink transmission.

7. The method of claim 1, wherein the protecting the first uplink transmission comprises protecting the DRB by opportunistic protection, comprising:
   if the first uplink transmission comprises time-sensitive data traffic, increasing a priority of the first uplink transmission relative to the second uplink transmission.

8. The method of claim 1, wherein the protecting the first uplink transmission comprises protecting the DRB by at least one of:
   in response to a hybrid automatic repeat request (HARQ) retransmission exhaustion, expediting failure recovery of the first uplink transmission by triggering radio link control (RLC) polling;
   prioritizing a High Speed-Dedicated Physical Control Channel (HS-DPCCH) of the first uplink transmission relative to the second uplink transmission, based on the presence of at least one of a HARQ acknowledgement, a HARQ not-acknowledgement, or a channel quality indicator (CQI) in the HS-DPCCH;
   prioritizing the first uplink transmission relative to the second uplink transmission, if enhanced uplink (EUL) Continuous Packet Connectivity (CPC) Discontinuous Transmission (DTX) operation is enabled;
   prioritizing the first uplink transmission relative to the second uplink transmission, if the first uplink transmission comprises an acknowledgement to High Speed Signaling Control Channel (HS-SCCH) orders to a network; or
   prioritizing the first uplink transmission relative to the second uplink transmission, if the first uplink transmission comprises Transmission Control Protocol (TCP) establishment traffic.

9. The method of claim 8, wherein the protecting the first uplink transmission comprises protecting the DRB by increasing a CQI feedback cycle of the HS-DPCCH.

10. The method of claim 8, wherein the protecting the first uplink transmission comprises protecting the DRB by increasing a power gain factor of the HS-DPCCH.

11. The method of claim 1, further comprising protecting the second uplink transmission based on voice activity of the second uplink transmission to reduce blanking of the second uplink transmission.

12. A user equipment (UE), comprising:
   a first radio access technology block configured to transmit a first uplink transmission for a first radio access technology (RAT) utilizing a shared transmission resource of the UE, wherein the first uplink transmission comprises at least one of a signaling radio bearer (SRB) or a data radio bearer (DRB);
   a second radio access technology block configured to transmit a second uplink transmission for a second RAT utilizing the shared transmission resource; and a TX sharing manager block configured to if the first uplink transmission and the second uplink transmission at least partially overlap in time, protect the first uplink transmission in accordance with one or more radio bearer protection rules, comprising:

protecting the SRB by setting a priority of the SRB based on a time-sensitivity and criticality of the SRB, and protecting the DRB by utilizing opportunistic protection without considering a timing of the second uplink transmission.

13. The UE of claim 12, wherein the TX sharing manager block is configured to at least one of:

set a blanking duty cycle of the SRB based on a transmission time interval (TTI) of the SRB; or protect the DRB by utilizing deterministic protection based on a timing of the second uplink transmission.

14. The UE of claim 12, wherein the TX sharing manager block comprises a DRB protection block for protecting the DRB by deterministic protection, and the DRB protection block is configured to:

hold off upcoming transmission or protocol data unit (PDU) building of the DRB based on a timing of the second uplink transmission, or increase a priority of the upcoming transmission of the DRB without considering a timing of the second uplink transmission.

15. The UE of claim 12, wherein the TX sharing manager block comprises a DRB protection block for protecting the DRB by opportunistic protection, and the DRB protection block is configured to:

reduce a duty cycle of the first uplink transmission, wherein the first uplink transmission has a higher priority in an ON cycle relative to that of an OFF cycle of the duty cycle.

16. The UE of claim 12, wherein the TX sharing manager block comprises a DRB protection block for protecting the DRB by opportunistic protection, and the DRB protection block is configured to:

reduce an Enhanced Transport Format Combination Indicator (E-TFCI) in accordance with a reduction factor, wherein the reduction factor is based on at least one of:

a blanking percentage within a transmission time interval (TTI) of the first uplink transmission, or a statistical blanking percentage of the first uplink transmission.

17. The UE of claim 12, wherein the TX sharing manager block comprises a DRB protection block for protecting the DRB by opportunistic protection, and the DRB protection block is configured to:

in response to a transmission failure of the first uplink transmission, increase a power gain factor of a retransmission of the first uplink transmission.

18. The UE of claim 12, wherein the TX sharing manager block comprises a DRB protection block for protecting the DRB by opportunistic protection, and the DRB protection block is configured to:

if the first uplink transmission comprises time-sensitive data traffic, increase a priority of the first uplink transmission relative to the second uplink transmission.

19. The UE of claim 12, wherein the TX sharing manager block comprises a DRB protection block for protecting the DRB, and the DRB protection block is configured to at least one of:

in response to a hybrid automatic repeat request (HARQ) retransmission exhaustion, expedite failure recovery of the first uplink transmission by triggering radio link control (RLC) polling;

prioritize a High Speed-Dedicated Physical Control Channel (HS-DPCCH) of the first uplink transmission relative to the second uplink transmission, based on the presence of at least one of a HARQ acknowledgement, a HARQ not-acknowledgement, or a channel quality indicator (CQI) in the HS-DPCCH;

prioritize the first uplink transmission relative to the second uplink transmission, if enhanced uplink (EUL) Continuous Packet Connectivity (CPC) Discontinuous Transmission (DTX) operation is enabled;

prioritize the first uplink transmission relative to the second uplink transmission, if the first uplink transmission comprises an acknowledgement to High Speed Signaling Control Channel (HS-SCCH) orders to a network; or prioritize the first uplink transmission relative to the second uplink transmission, if the first uplink transmission comprises Transmission Control Protocol (TCP) establishment traffic.

20. The UE of claim 19, wherein the DRB protection block is further configured to increase a CQI feedback cycle of the HS-DPCCH.

21. The UE of claim 19, wherein the DRB protection block is further configured to protect the DRB by increasing a power gain factor of the HS-DPCCH.

22. The UE of claim 12, wherein the TX sharing manager block is configured to protect the second uplink transmission based on voice activity of the second uplink transmission to reduce blanking of the second uplink transmission.

23. A user equipment (UE), comprising:

means for transmitting a first uplink transmission for a first radio access technology (RAT) utilizing a shared transmission resource of the UE, wherein the first uplink transmission comprises at least one of a signaling radio bearer (SRB) or a data radio bearer (DRB);

means for transmitting a second uplink transmission for a second RAT utilizing the shared transmission resource; and means for if the first uplink transmission and the second uplink transmission at least partially overlap in time, protecting the first uplink transmission in accordance with one or more radio bearer protection rules, comprising:

protecting the SRB by setting a priority of the SRB based on a time-sensitivity and criticality of the SRB, and protecting the DRB by utilizing opportunistic protection without considering a timing of the second uplink transmission.

24. A non-transitory computer readable medium comprising code for causing a user equipment (UE) to:

transmit a first uplink transmission for a first radio access technology (RAT) utilizing a shared transmission resource of the UE, wherein the first uplink transmission comprises at least one of a signaling radio bearer (SRB) or a data radio bearer (DRB);

transmit a second uplink transmission for a second RAT utilizing the shared transmission resource; and if the first uplink transmission and the second uplink transmission at least partially overlap in time, protect the first uplink transmission in accordance with one or more radio bearer protection rules, comprising:

protecting the SRB by setting a priority of the SRB based on a time-sensitivity and criticality of the SRB, and protecting the DRB by utilizing opportunistic protection without considering a timing of the second uplink transmission.

* * * * *